(12) United States Patent
Fadeev et al.

(10) Patent No.: US 12,365,528 B2
(45) Date of Patent: Jul. 22, 2025

(54) ULTRAVIOLET LIGHT-BLOCKING COATED PHARMACEUTICAL PACKAGES

(71) Applicant: CORNING INCORPORATED, Corning, NY (US)

(72) Inventors: Andrei Gennadyevich Fadeev, Newtown, PA (US); David Henry, Fontaine le Port (FR); Valerie Claudine Lacarriere, Larchant (FR); John Stephen Peanasky, Big Flats, NY (US); Shreya Roy Choudhury, Corning, NY (US); Kristi Lynn Simonton, Erin, NY (US); Bryan Henry Smith, Horseheads, NY (US); Jean-Jacques Bernard Theron, Montigny sur Loing (FR)

(73) Assignee: CORNING INCORPORATED, Corning, NY (US)

( * ) Notice: Subject to any disclaimer, the term of this patent is extended or adjusted under 35 U.S.C. 154(b) by 993 days.

(21) Appl. No.: 17/466,746

(22) Filed: Sep. 3, 2021

(65) Prior Publication Data

US 2022/0073256 A1 Mar. 10, 2022

Related U.S. Application Data

(60) Provisional application No. 63/074,915, filed on Sep. 4, 2020.

(51) Int. Cl.
*B65D 81/30* (2006.01)
*A61J 1/00* (2023.01)
(Continued)

(52) U.S. Cl.
CPC ............... *B65D 81/30* (2013.01); *A61J 1/00* (2013.01); *A61J 1/065* (2013.01); *A61J 1/1468* (2015.05);
(Continued)

(58) Field of Classification Search
CPC ... C03C 17/003; C03C 17/005; C03C 17/007; C03C 17/008; C03C 17/23; C03C 17/25;
(Continued)

(56) References Cited

U.S. PATENT DOCUMENTS 2,644,802 A 7/1953 Lontz
2,662,035 A 12/1953 Levi
(Continued)

FOREIGN PATENT DOCUMENTS

AU 2017206194 A1 8/2017
AU 2019204975 A1 8/2019
(Continued)

OTHER PUBLICATIONS

Technical Information—Uvinul 3050, BASF, Oct. 2020, https://plastics-rubber.basf.com/dam/jcr:76f6b83a-040d-3c97-bb16-20968148bab9/basf/plastics-rubber/sd-plastic-additives/products/files/TI_Uvinul_3050_EVF_1053%20e_V10-2020.pdf(Year: 2020).*
(Continued)

*Primary Examiner* — Michael C Romanowski
(74) *Attorney, Agent, or Firm* — Chandra J. Duncan

(57) ABSTRACT

According to one or more embodiments disclosed herein, a coated pharmaceutical package may comprise a glass container comprising a first surface and a second surface opposite the first surface, wherein the first surface is an outer surface of the glass container, and wherein the glass container in an uncoated state has an average light transmittance in the UVB and UVC spectrum of at least 50% through a single wall of the coated package. The coated pharmaceutical package may further comprise a coating positioned over at least a portion of the first surface of the glass container, wherein the coated pharmaceutical package has an average light transmittance in the UVC spectrum of less than 50% through a single wall of the coated package.

10 Claims, 13 Drawing Sheets

(51) Int. Cl.
  *A61J 1/06* (2006.01)
  *A61J 1/14* (2023.01)
  *B65D 25/54* (2006.01)
  *C03C 17/00* (2006.01)
  *C03C 17/28* (2006.01)
  *C03C 17/30* (2006.01)
  *C09D 5/32* (2006.01)

(52) U.S. Cl.
  CPC ............ *B65D 25/54* (2013.01); *C03C 17/005* (2013.01); *C03C 17/009* (2013.01); *C03C 17/28* (2013.01); *C03C 17/30* (2013.01); *C03C 2217/74* (2013.01); *C09D 5/32* (2013.01)

(58) Field of Classification Search
  CPC ......... C03C 17/28; C03C 17/32; C03C 17/34; C03C 17/3657; C03C 2217/73; C03C 2217/734; C03C 2217/74; B65D 81/24; B65D 81/30; B32B 1/02; G21F 1/10–106; C09D 5/32
  USPC ................................................. 428/34.1–36.92
  See application file for complete search history.

(56) References Cited

U.S. PATENT DOCUMENTS

| | | |
|---|---|---|
| 2,691,548 A | 10/1954 | Otto et al. |
| 3,004,863 A | 10/1961 | Gray et al. |
| 3,179,634 A | 4/1965 | Edwards |
| 3,287,311 A | 11/1966 | Edwards |
| 3,323,889 A | 6/1967 | Carl et al. |
| 3,395,069 A | 7/1968 | Plueddemann |
| 3,420,698 A | 1/1969 | Smith |
| 3,441,432 A | 4/1969 | Levene |
| 3,445,267 A | 5/1969 | Layne |
| 3,460,960 A | 8/1969 | Francel et al. |
| 3,577,256 A | 5/1971 | Benford, Jr. |
| 3,607,186 A | 9/1971 | Bognar |
| 3,674,690 A | 7/1972 | Clow et al. |
| 3,772,061 A | 11/1973 | McCoy et al. |
| 3,791,809 A | 2/1974 | Lau |
| 3,801,361 A | 4/1974 | Kitaj |
| 3,811,921 A | 5/1974 | Crawford et al. |
| 3,819,346 A | 6/1974 | Southwick et al. |
| 3,844,754 A | 10/1974 | Grubb et al. |
| 3,878,960 A | 4/1975 | Jonsson et al. |
| 3,900,329 A | 8/1975 | Grubb et al. |
| 3,926,604 A | 12/1975 | Smay et al. |
| 3,958,073 A | 5/1976 | Trevisan et al. |
| 3,989,864 A | 11/1976 | Hey et al. |
| 4,030,904 A | 6/1977 | Battye et al. |
| 4,056,208 A | 11/1977 | Prejean |
| 4,056,651 A | 11/1977 | Scola |
| 4,065,317 A | 12/1977 | Baak et al. |
| 4,065,589 A | 12/1977 | Lenard et al. |
| 4,086,373 A | 4/1978 | Tobias et al. |
| 4,093,759 A | 6/1978 | Otsuki et al. |
| 4,130,677 A | 12/1978 | Huntsberger |
| 4,161,556 A | 7/1979 | Lenard et al. |
| 4,164,402 A | 8/1979 | Watanabe |
| 4,214,886 A | 7/1980 | Shay et al. |
| 4,215,165 A | 7/1980 | Gras et al. |
| 4,238,041 A | 12/1980 | Bodelind et al. |
| 4,264,658 A | 4/1981 | Tobias et al. |
| 4,280,944 A | 7/1981 | Saito et al. |
| 4,315,573 A | 2/1982 | Bradley et al. |
| 4,351,882 A | 9/1982 | Concannon |
| 4,385,086 A | 5/1983 | Nakayama et al. |
| 4,386,164 A | 5/1983 | Moser |
| 4,395,527 A | 7/1983 | Berger |
| 4,431,692 A | 2/1984 | Hofmann et al. |
| 4,558,110 A | 12/1985 | Lee |
| 4,595,548 A | 6/1986 | St. Clair et al. |
| 4,603,061 A | 7/1986 | St. Clair et al. |
| 4,620,985 A | 11/1986 | Goodburn et al. |
| 4,636,411 A | 1/1987 | Dubois et al. |
| 4,654,235 A | 3/1987 | Effenberger et al. |
| 4,668,268 A | 5/1987 | Lindner et al. |
| 4,680,373 A | 7/1987 | Gallagher et al. |
| 4,689,085 A | 8/1987 | Plueddemann |
| 4,696,994 A | 9/1987 | Nakajima et al. |
| 4,748,228 A | 5/1988 | Shoji et al. |
| 4,749,614 A | 6/1988 | Andrews et al. |
| 4,767,414 A | 8/1988 | Williams et al. |
| 4,778,727 A | 10/1988 | Tesoro et al. |
| 4,842,889 A | 6/1989 | Hu et al. |
| 4,860,906 A | 8/1989 | Pellegrini et al. |
| 4,880,895 A | 11/1989 | Higashi et al. |
| 4,882,210 A | 11/1989 | Romberg et al. |
| 4,902,106 A | 2/1990 | Dijon et al. |
| 4,923,960 A | 5/1990 | Chen et al. |
| 4,931,539 A | 6/1990 | Hayes |
| 4,961,976 A | 10/1990 | Hashimoto et al. |
| 4,961,996 A | 10/1990 | Carre et al. |
| 4,988,288 A | 1/1991 | Melgaard |
| 5,002,359 A | 3/1991 | Sayegh |
| 5,036,145 A | 7/1991 | Echterling et al. |
| 5,037,701 A | 8/1991 | Carre et al. |
| 5,049,421 A | 9/1991 | Kosh |
| 5,112,658 A | 5/1992 | Skutnik et al. |
| 5,114,757 A | 5/1992 | Linde et al. |
| 5,120,341 A | 6/1992 | Nozawa et al. |
| 5,124,618 A | 6/1992 | Ohtaka et al. |
| 5,137,751 A | 8/1992 | Burgess et al. |
| 5,182,148 A * | 1/1993 | Kapp ..................... C03C 17/32 252/589 |
| 5,206,337 A | 4/1993 | Takeda et al. |
| 5,209,981 A | 5/1993 | Rojstaczer |
| 5,230,429 A | 7/1993 | Etheredge, III |
| 5,232,783 A | 8/1993 | Pawar et al. |
| 5,246,782 A | 9/1993 | Kennedy et al. |
| 5,251,071 A | 10/1993 | Kusukawa et al. |
| 5,252,703 A | 10/1993 | Nakajima et al. |
| 5,258,487 A | 11/1993 | Okinoshima et al. |
| 5,281,690 A | 1/1994 | Flaim et al. |
| 5,286,527 A | 2/1994 | Blum et al. |
| 5,302,458 A | 4/1994 | Blum et al. |
| 5,306,537 A | 4/1994 | Gustafson et al. |
| 5,310,862 A | 5/1994 | Nomura et al. |
| 5,326,601 A | 7/1994 | Kawano et al. |
| 5,336,925 A | 8/1994 | Moss et al. |
| 5,337,537 A | 8/1994 | Soughan |
| 5,403,700 A | 4/1995 | Heller et al. |
| 5,476,692 A | 12/1995 | Ellis et al. |
| 5,482,768 A | 1/1996 | Kawasato et al. |
| 5,488,092 A | 1/1996 | Kausch et al. |
| 5,498,758 A | 3/1996 | Scholes et al. |
| 5,504,830 A | 4/1996 | Ngo et al. |
| 5,594,231 A | 1/1997 | Pellicori et al. |
| 5,601,905 A | 2/1997 | Watanabe et al. |
| 5,633,079 A | 5/1997 | Shoshi et al. |
| 5,736,251 A | 4/1998 | Pinchuk |
| 5,736,476 A | 4/1998 | Watzke et al. |
| 5,756,144 A | 5/1998 | Wolff et al. |
| 5,849,369 A | 12/1998 | Ogawa |
| 5,851,200 A | 12/1998 | Higashikawa et al. |
| 5,908,542 A | 6/1999 | Lee et al. |
| 5,916,632 A | 6/1999 | Mishina et al. |
| 5,938,919 A | 8/1999 | Najafabadi |
| 5,979,714 A | 11/1999 | Bleile et al. |
| 6,013,333 A | 1/2000 | Carson et al. |
| 6,046,758 A | 4/2000 | Brown et al. |
| 6,048,911 A | 4/2000 | Shustack et al. |
| 6,084,034 A | 7/2000 | Miyama et al. |
| 6,096,432 A | 8/2000 | Sakaguchi et al. |
| 6,156,435 A | 12/2000 | Gleason et al. |
| 6,214,429 B1 | 4/2001 | Zou et al. |
| 6,232,428 B1 | 5/2001 | Deets et al. |
| 6,277,950 B1 | 8/2001 | Yang et al. |
| 6,346,315 B1 | 2/2002 | Sawatsky |
| 6,358,519 B1 | 3/2002 | Waterman |
| 6,444,783 B1 | 9/2002 | Dodd et al. |
| 6,472,068 B1 | 10/2002 | Glass et al. |

(56) References Cited

U.S. PATENT DOCUMENTS

| | | |
|---|---|---|
| 6,482,509 B2 | 11/2002 | Buch-Rasmussen et al. |
| 6,561,275 B2 | 5/2003 | Glass et al. |
| 6,586,039 B2 | 7/2003 | Heinz et al. |
| 6,599,594 B1 | 7/2003 | Walther et al. |
| 6,627,377 B1 | 9/2003 | Itatani et al. |
| 6,627,569 B1 | 9/2003 | Naumann et al. |
| 6,737,105 B2 | 5/2004 | Richard |
| 6,797,396 B1 | 9/2004 | Liu et al. |
| 6,818,576 B2 | 11/2004 | Ikenishi et al. |
| 6,852,393 B2 | 2/2005 | Gandon |
| 6,866,158 B1 | 3/2005 | Sommer et al. |
| 6,921,788 B1 | 7/2005 | Izawa et al. |
| 6,939,819 B2 | 9/2005 | Usui et al. |
| 6,989,181 B2 | 1/2006 | Brandt |
| 7,087,307 B2 | 8/2006 | Nagashima et al. |
| 7,201,965 B2 | 4/2007 | Gulati et al. |
| 7,215,473 B2 | 5/2007 | Fleming |
| 7,236,296 B2 | 6/2007 | Liu et al. |
| 7,315,125 B2 | 1/2008 | Kass et al. |
| 7,466,480 B2 | 12/2008 | Berninger |
| 7,470,999 B2 | 12/2008 | Saito et al. |
| 7,569,653 B2 | 8/2009 | Landon |
| 7,619,042 B2 | 11/2009 | Poe et al. |
| 7,659,002 B2 * | 2/2010 | Coster .............. B32B 17/10036 |
| | | 428/428 |
| 7,785,517 B2 | 8/2010 | Poe et al. |
| 7,845,346 B2 | 12/2010 | Langford et al. |
| 7,871,554 B2 | 1/2011 | Oishi et al. |
| 7,985,188 B2 | 7/2011 | Felts et al. |
| 8,048,938 B2 | 11/2011 | Poe et al. |
| 8,053,492 B2 | 11/2011 | Poe et al. |
| 8,110,652 B2 | 2/2012 | Bito et al. |
| 8,234,883 B2 | 8/2012 | Krall et al. |
| 8,273,801 B2 | 9/2012 | Baikerikar et al. |
| 8,277,945 B2 | 10/2012 | Anderson et al. |
| 8,309,627 B2 | 11/2012 | Poe et al. |
| 8,324,304 B2 | 12/2012 | Burch et al. |
| 8,518,545 B2 | 8/2013 | Akiba et al. |
| 9,034,442 B2 | 5/2015 | Chang et al. |
| 9,428,302 B2 | 8/2016 | Fadeev et al. |
| 9,763,852 B2 | 9/2017 | Fadeev et al. |
| 9,918,898 B2 | 3/2018 | Fadeev et al. |
| 10,034,816 B2 | 7/2018 | Fadeev et al. |
| 10,737,973 B2 | 8/2020 | Bayne et al. |
| 2002/0016438 A1 | 2/2002 | Sugo et al. |
| 2002/0037943 A1 | 3/2002 | Madsen |
| 2002/0081401 A1 | 6/2002 | Hessok et al. |
| 2002/0155216 A1 | 10/2002 | Reitz et al. |
| 2002/0182410 A1 | 12/2002 | Szum et al. |
| 2003/0031799 A1 | 2/2003 | Haque |
| 2003/0077459 A1 * | 4/2003 | Vitt .................... C03C 17/3417 |
| | | 428/432 |
| 2004/0048997 A1 | 3/2004 | Sugo |
| 2004/0105985 A1 | 6/2004 | Henze et al. |
| 2004/0129026 A1 | 7/2004 | Bartsch |
| 2004/0199138 A1 | 10/2004 | McBay et al. |
| 2005/0009953 A1 | 1/2005 | Shea |
| 2005/0048297 A1 | 3/2005 | Fukuda et al. |
| 2005/0121024 A1 * | 6/2005 | Langford ............ A61M 15/009 |
| | | 128/200.23 |
| 2005/0154181 A1 | 7/2005 | Dueber et al. |
| 2005/0170722 A1 | 8/2005 | Keese |
| 2006/0054526 A1 * | 3/2006 | Dean .................... A61L 2/081 |
| | | 206/459.1 |
| 2006/0099360 A1 | 5/2006 | Farha |
| 2006/0233675 A1 | 10/2006 | Stein |
| 2007/0082135 A1 | 4/2007 | Lee |
| 2007/0116907 A1 | 5/2007 | Landon et al. |
| 2007/0157919 A1 | 7/2007 | Marandon |
| 2007/0178256 A1 | 8/2007 | Landon |
| 2007/0187280 A1 | 8/2007 | Haines et al. |
| 2007/0224427 A1 | 9/2007 | Kunita et al. |
| 2007/0225823 A1 | 9/2007 | Hawkins et al. |
| 2007/0293388 A1 | 12/2007 | Zuyev et al. |
| 2008/0008838 A1 * | 1/2008 | Arpac ................ C08G 18/5015 |
| | | 106/287.15 |
| 2008/0044683 A1 | 2/2008 | Chan et al. |
| 2008/0069970 A1 | 3/2008 | Wu |
| 2008/0071228 A1 | 3/2008 | Wu et al. |
| 2008/0114096 A1 | 5/2008 | Qu et al. |
| 2008/0121621 A1 | 5/2008 | Stockum et al. |
| 2008/0199618 A1 | 8/2008 | Wen et al. |
| 2008/0214777 A1 | 9/2008 | Poe |
| 2008/0281260 A1 | 11/2008 | William et al. |
| 2008/0292496 A1 | 11/2008 | Madsen |
| 2009/0048537 A1 | 2/2009 | Lydon et al. |
| 2009/0054615 A1 | 2/2009 | Poe et al. |
| 2009/0092759 A1 | 4/2009 | Chen et al. |
| 2009/0126404 A1 | 5/2009 | Sakhrani et al. |
| 2009/0155490 A1 * | 6/2009 | Bicker .............. H01J 37/32394 |
| | | 118/723 R |
| 2009/0155506 A1 | 6/2009 | Martin et al. |
| 2009/0155570 A1 | 6/2009 | Bonnet et al. |
| 2009/0162530 A1 | 6/2009 | Nesbitt |
| 2009/0162664 A1 | 6/2009 | Ou |
| 2009/0176108 A1 | 7/2009 | Toyama et al. |
| 2009/0197048 A1 | 8/2009 | Amin et al. |
| 2009/0197088 A1 | 8/2009 | Murata |
| 2009/0197390 A1 | 8/2009 | Rothwell et al. |
| 2009/0203929 A1 | 8/2009 | Hergenrother et al. |
| 2009/0208175 A1 | 8/2009 | Hongo et al. |
| 2009/0208657 A1 | 8/2009 | Siebenlist et al. |
| 2009/0239759 A1 | 9/2009 | Balch |
| 2009/0247699 A1 | 10/2009 | Buehler et al. |
| 2009/0275462 A1 | 11/2009 | Murata |
| 2009/0286058 A1 | 11/2009 | Shibata et al. |
| 2009/0297857 A1 | 12/2009 | Pascal et al. |
| 2009/0315002 A1 * | 12/2009 | Ott .......................... C03C 3/118 |
| | | 252/588 |
| 2009/0325776 A1 | 12/2009 | Murata |
| 2010/0044268 A1 | 2/2010 | Haines et al. |
| 2010/0047521 A1 | 2/2010 | Amin et al. |
| 2010/0055373 A1 | 3/2010 | Laue et al. |
| 2010/0062188 A1 | 3/2010 | Miyamoto et al. |
| 2010/0087307 A1 | 4/2010 | Murata et al. |
| 2010/0101628 A1 * | 4/2010 | Poe ....................... C09D 151/08 |
| | | 136/244 |
| 2010/0249309 A1 | 9/2010 | Lewin et al. |
| 2010/0255221 A1 | 10/2010 | Jung et al. |
| 2010/0264645 A1 | 10/2010 | Jones et al. |
| 2010/0273019 A1 | 10/2010 | Kitaike et al. |
| 2010/0317506 A1 | 12/2010 | Fechner et al. |
| 2010/0317821 A1 | 12/2010 | Jung et al. |
| 2011/0014475 A1 | 1/2011 | Murata |
| 2011/0045219 A1 | 2/2011 | Stewart et al. |
| 2011/0062619 A1 | 3/2011 | Laine et al. |
| 2011/0065576 A1 | 3/2011 | Campbell et al. |
| 2011/0071257 A1 * | 3/2011 | Henry ..................... C09K 9/02 |
| | | 252/586 |
| 2011/0091732 A1 | 4/2011 | Lu et al. |
| 2011/0098172 A1 | 4/2011 | Brix |
| 2011/0159318 A1 | 6/2011 | Endo et al. |
| 2011/0177252 A1 | 7/2011 | Kanagasabapathy et al. |
| 2011/0177987 A1 | 7/2011 | Lenting et al. |
| 2011/0189486 A1 | 8/2011 | Wendell, Jr. |
| 2011/0200805 A1 | 8/2011 | Tomamoto et al. |
| 2011/0226658 A1 | 9/2011 | Tata-Venkata et al. |
| 2011/0272322 A1 | 11/2011 | Yamagata et al. |
| 2011/0274916 A1 | 11/2011 | Murata |
| 2011/0311796 A1 | 12/2011 | Jung et al. |
| 2011/0313363 A1 | 12/2011 | D'Souza et al. |
| 2012/0016076 A1 | 1/2012 | Kim et al. |
| 2012/0034435 A1 | 2/2012 | Borrelli et al. |
| 2012/0052302 A1 | 3/2012 | Matusick et al. |
| 2012/0061342 A1 | 3/2012 | Perrot |
| 2012/0088888 A1 | 4/2012 | Nagao |
| 2012/0097159 A1 | 4/2012 | Iyer et al. |
| 2012/0107174 A1 | 5/2012 | Zambaux |
| 2012/0142829 A1 | 6/2012 | Ichinose |
| 2012/0148770 A1 | 6/2012 | Rong et al. |
| 2012/0172519 A1 | 7/2012 | Doerr et al. |
| 2012/0199203 A1 | 8/2012 | Nishizawa et al. |
| 2012/0251748 A1 | 10/2012 | Ashmead et al. |

(56) References Cited

U.S. PATENT DOCUMENTS

| | | |
|---|---|---|
| 2012/0282449 A1 | 11/2012 | Gross |
| 2013/0071078 A1 | 3/2013 | Bennett et al. |
| 2013/0071669 A1* | 3/2013 | Kodaira .................. C09D 5/32 252/588 |
| 2013/0095261 A1 | 4/2013 | Ahn et al. |
| 2013/0101792 A1 | 4/2013 | Pranov |
| 2013/0211344 A1 | 8/2013 | Rodriguez et al. |
| 2013/0299380 A1 | 11/2013 | Zambaux et al. |
| 2014/0001076 A1 | 1/2014 | Fadeev et al. |
| 2014/0001143 A1 | 1/2014 | Fadeev et al. |
| 2014/0023860 A1* | 1/2014 | Kodaira .................. C09D 7/45 252/587 |
| 2014/0031499 A1 | 1/2014 | Cho et al. |
| 2014/0069202 A1 | 3/2014 | Fisk |
| 2014/0150499 A1 | 6/2014 | Danielson et al. |
| 2014/0151370 A1 | 6/2014 | Chang et al. |
| 2014/0220327 A1 | 8/2014 | Adib et al. |
| 2014/0272215 A1 | 9/2014 | Danielson et al. |
| 2014/0323800 A1 | 10/2014 | Dye |
| 2014/0339194 A1 | 11/2014 | Gu et al. |
| 2014/0356633 A1* | 12/2014 | Liang ...................... C09D 5/08 428/428 |
| 2015/0024145 A1 | 1/2015 | Bockmeyer et al. |
| 2015/0053339 A1 | 2/2015 | Ducharme et al. |
| 2015/0203631 A1 | 7/2015 | Miyazaki et al. |
| 2015/0329416 A1 | 11/2015 | Fadeev et al. |
| 2015/0360999 A1 | 12/2015 | Fadeev et al. |
| 2016/0068703 A1* | 3/2016 | Schmidt .................. C08K 3/22 427/407.1 |
| 2016/0096969 A1* | 4/2016 | Jindal .................. B05D 3/0272 427/407.1 |
| 2016/0145150 A1 | 5/2016 | Bookbinder et al. |
| 2016/0251260 A1 | 9/2016 | Bayne et al. |
| 2017/0036950 A1 | 2/2017 | Fadeev et al. |
| 2017/0036951 A1 | 2/2017 | Chang et al. |
| 2017/0088459 A1 | 3/2017 | Henry et al. |
| 2017/0121058 A1 | 5/2017 | Henry et al. |
| 2017/0166761 A1* | 6/2017 | Kim ...................... C09D 183/04 |
| 2017/0233287 A1* | 8/2017 | Li .......................... C03C 3/089 428/172 |
| 2017/0320773 A1 | 11/2017 | Bookbinder et al. |
| 2017/0341812 A1* | 11/2017 | DeMartino ........ B23K 26/0622 |
| 2017/0348192 A1 | 12/2017 | Fadeev et al. |
| 2018/0116907 A1 | 5/2018 | Fadeev et al. |
| 2018/0303708 A1 | 10/2018 | Fadeev et al. |
| 2018/0318169 A1 | 11/2018 | Fadeev et al. |
| 2019/0076331 A1 | 3/2019 | Fadeev et al. |
| 2019/0077702 A1 | 3/2019 | Chang et al. |
| 2019/0084875 A1 | 3/2019 | Chang et al. |
| 2019/0210768 A1 | 7/2019 | Adib et al. |
| 2020/0093821 A1* | 3/2020 | Krekeler ............... A61K 9/0019 |
| 2020/0140312 A1* | 5/2020 | Yokota .................. C03C 3/11 |
| 2021/0114922 A1* | 4/2021 | Raisbeck ............... C03C 17/009 |
| 2021/0188697 A1* | 6/2021 | Hong ...................... C03C 4/20 |
| 2023/0086353 A1* | 3/2023 | Dubertret ............... C08F 18/24 428/34.7 |

FOREIGN PATENT DOCUMENTS

| | | | |
|---|---|---|---|
| CA | 853121 A | 10/1970 | |
| CA | 1333785 C | 1/1995 | |
| CN | 2483332 Y | 3/2002 | |
| CN | 1963650 A | 5/2007 | |
| CN | 101190969 A | 6/2008 | |
| CN | 101479355 A | 7/2009 | |
| CN | 101585666 A | 11/2009 | |
| CN | 201390409 Y | 1/2010 | |
| CN | 201404453 Y | 2/2010 | |
| CN | 101717189 A | 6/2010 | |
| CN | 101831175 A | 9/2010 | |
| CN | 201694531 U | 1/2011 | |
| CN | 102002319 | 4/2011 | |
| CN | 102050572 A | 5/2011 | |
| CN | 102066462 A | 5/2011 | |
| CN | 202006114 U | 10/2011 | |
| CN | 102317168 A | 1/2012 | |
| CN | 103562324 A | 2/2014 | |
| CN | 104194618 A | 12/2014 | |
| CN | 204723400 U | 10/2015 | |
| CN | 108137392 A | 6/2018 | |
| DE | 1167706 B | 4/1964 | |
| DE | 1954314 A1 | 5/1971 | |
| DE | 4128634 A1 | 3/1993 | |
| DE | 4213544 A1 * | 3/1993 | ............... A61J 1/14 |
| DE | 4130414 A1 | 4/1993 | |
| DE | 29702816 U1 | 4/1997 | |
| DE | 20308421 U1 * | 8/2003 | ............... A61J 1/14 |
| DE | 102004011009 A1 | 9/2005 | |
| EP | 0176062 A2 | 4/1986 | |
| EP | 0330456 A1 | 8/1989 | |
| EP | 0515801 A1 | 12/1992 | |
| EP | 0524802 A1 | 1/1993 | |
| EP | 1184403 A2 | 3/2002 | |
| EP | 1193185 A1 | 4/2002 | |
| EP | 1464631 A2 | 10/2004 | |
| EP | 2031124 A1 | 3/2009 | |
| EP | 2540682 A1 | 1/2013 | |
| EP | 3150564 A1 | 4/2017 | |
| ES | 2737753 A1 * | 1/2020 | ............. B65D 23/08 |
| FR | 0093015 E | 1/1969 | |
| FR | 2033431 A5 | 12/1970 | |
| FR | 2973804 A1 | 10/2012 | |
| GB | 0702292 A | 1/1954 | |
| GB | 0720778 A | 12/1954 | |
| GB | 0966731 A | 8/1964 | |
| GB | 1267855 A | 3/1972 | |
| GB | 1529386 A | 10/1978 | |
| GB | 2382560 A1 * | 6/2003 | ............. B65D 23/02 |
| JP | 49-115088 A | 11/1974 | |
| JP | 56-063845 A | 5/1981 | |
| JP | 56-155044 A | 12/1981 | |
| JP | 57-038346 A | 3/1982 | |
| JP | 57-123223 A | 7/1982 | |
| JP | 58-156553 A | 9/1983 | |
| JP | 60-254022 A | 12/1985 | |
| JP | 61-047932 A | 3/1986 | |
| JP | 62-047623 A | 3/1987 | |
| JP | 62-068828 A | 3/1987 | |
| JP | 62-140257 A | 6/1987 | |
| JP | 62-172081 A | 7/1987 | |
| JP | 63-236731 A | 10/1988 | |
| JP | 63-270330 A | 11/1988 | |
| JP | 01-079269 A | 3/1989 | |
| JP | 64-079269 A | 3/1989 | |
| JP | 01-201047 A | 8/1989 | |
| JP | 01-279058 A | 11/1989 | |
| JP | 02-225344 A | 9/1990 | |
| JP | 05-213631 A | 8/1993 | |
| JP | 06-147932 A | 5/1994 | |
| JP | 07-223845 A | 8/1995 | |
| JP | 08-003510 A | 1/1996 | |
| JP | 08-151564 A | 6/1996 | |
| JP | 11-171593 A | 6/1999 | |
| JP | 11-314931 A | 11/1999 | |
| JP | 2000-007372 A | 1/2000 | |
| JP | 2000-211644 A | 8/2000 | |
| JP | 2000-219621 A | 8/2000 | |
| JP | 2001-033348 A | 2/2001 | |
| JP | 2001-072441 A | 3/2001 | |
| JP | 2001-180969 A | 7/2001 | |
| JP | 2001-192239 A | 7/2001 | |
| JP | 2001-229526 A | 8/2001 | |
| JP | 2001-236634 A | 8/2001 | |
| JP | 2001-302284 A | 10/2001 | |
| JP | 2002-003241 A | 1/2002 | |
| JP | 2002-249340 A | 9/2002 | |
| JP | 2003-053259 A | 2/2003 | |
| JP | 2003-146699 A | 5/2003 | |
| JP | 2004-161993 A | 6/2004 | |
| JP | 2004-323058 A | 11/2004 | |
| JP | 2006-100379 A | 4/2006 | |
| JP | 2006-291049 A | 10/2006 | |
| JP | 3879940 B2 | 2/2007 | |

(56) References Cited

FOREIGN PATENT DOCUMENTS

| | | |
|---|---|---|
| JP | 2008-195602 A | 8/2008 |
| JP | 2009-108181 A | 5/2009 |
| JP | 2009-523105 A | 6/2009 |
| JP | 2009-207618 A | 9/2009 |
| JP | 2010-059038 A | 3/2010 |
| JP | 4483331 B2 | 6/2010 |
| JP | 2012-224824 A | 11/2012 |
| JP | 2013-003310 A | 1/2013 |
| JP | 6462922 B1 | 1/2019 |
| KR | 10-2006-0033585 A | 4/2006 |
| KR | 10-0630-3090000 B1 | 9/2006 |
| KR | 10-0630309 | 10/2006 |
| KR | 10-2018-0075547 A | 7/2018 |
| MX | 2008015077 A | 12/2008 |
| RO | 83460 A2 | 3/1984 |
| RU | 2071492 C1 | 1/1997 |
| RU | 2220219 C1 | 12/2003 |
| RU | 2514939 C2 | 5/2014 |
| SU | 504719 A1 | 2/1976 |
| SU | 990700 A1 | 1/1983 |
| SU | 83460 A2 | 3/1984 |
| TW | 201034993 A | 10/2010 |
| TW | 201113233 A | 4/2011 |
| TW | 201213260 A | 4/2012 |
| TW | 201223895 A | 6/2012 |
| TW | 201425255 A | 7/2014 |
| WO | 90/05031 A1 | 5/1990 |
| WO | 95/10487 A1 | 4/1995 |
| WO | 97/25932 A1 | 7/1997 |
| WO | 01/17569 A2 | 3/2001 |
| WO | 2002/016235 A1 | 2/2002 |
| WO | 2003/063197 A1 | 7/2003 |
| WO | 2007/097376 A1 | 8/2007 |
| WO | 2008/050500 A1 | 5/2008 |
| WO | 2009/002660 A2 | 12/2008 |
| WO | 2009/028862 A1 | 3/2009 |
| WO | 2009/095569 A1 | 8/2009 |
| WO | 2010/115728 A2 | 10/2010 |
| WO | 2010/129758 A1 | 11/2010 |
| WO | 2010/136510 A1 | 12/2010 |
| WO | 2011/047840 A2 | 4/2011 |
| WO | 2011/069338 A1 | 6/2011 |
| WO | 2011/073106 A1 | 6/2011 |
| WO | 2011/080543 A1 | 7/2011 |
| WO | 2011/103798 A1 | 9/2011 |
| WO | 2011/145661 A1 | 11/2011 |
| WO | 2012/013920 A1 | 2/2012 |
| WO | 2012/047950 A1 | 4/2012 |
| WO | 2013/063290 A1 | 5/2013 |
| WO | 2013/130724 A2 | 9/2013 |
| WO | 2014/005030 A1 | 1/2014 |
| WO | 2014/085242 A1 | 6/2014 |
| WO | 2014/085244 A1 | 6/2014 |
| WO | 2014/085246 A1 | 6/2014 |
| WO | 2014/085249 A1 | 6/2014 |
| WO | 2016/085867 A1 | 6/2016 |
| WO | 2016/138455 A1 | 9/2016 |
| WO | 2017/075435 A1 | 5/2017 |
| WO | 2020/046665 A1 | 3/2020 |
| WO | 2021/165487 A1 | 8/2021 |
| ZA | 976079 | 3/1998 |
| ZA | 9706079 A | 3/1998 |

OTHER PUBLICATIONS

Radiation: Ultraviolet (UV) radiation, World Health Organization, Mar. 9, 2016, https://www.who.int/news-room/questions-and-answers/item/radiation-ultraviolet-(uv)#:~:text=The%20UV%20region%20covers%20the,(100%2D280%20nm) (Year: 2016).*

Fiolax Clear—Technical Data Sheet, Schott, https://media.schott.com/api/public/content/3f86fbf7361c44d09f4157dafe12ec54?v=75824a48 (Year: 2017).*

Fiolax—Special Glass Tubing for Pharmaceutical Packaging, https://media.schott.com/api/public/content/b5d4fce52f744030bbc526e1132e3139?v=69030556 (Year: 2017).*

"DuPont Teflon PFA TE-7224 Aqueous Fluoropolymers made with Echelon Dispersion Technology" [online]. Dupont, 2006. Retrieved from the Internet: <URL: http://www2.dupont.com/Teflon_Industrial/en_US/assets/downloads/k15758.pdf>.

"Lyophilization: Growing with Biotechnology", Genetic Engineering & Biotechnology News, Sep. 15, 2005, vol. 25, No. 16, acquired from https://www.genengnews.com/magazine/35/lyophilization-growing-with-biotechnology/(Year: 2005), pp. 1-7.

"Spectroscopic Ellipsometry Methods for Thin Absorbing Coatings" by Hilfiker et al. from Society of Vacuum Coaters 505/856-7188, pp. 511-516, 51st Annual Technical Conference Proceedings, Chicago, IL, Apr. 19-24, 2008).

"Thermal Stability of the Silica-Aminopropylsilane-Polyimide Interface", Linde, et al. Journal of Polymer Science, Polymer Chemistry Edition, vol. 22, 3043-3062, John Wiley & Sons, Inc. (1984).

Anderson, et al., "Polyimide-Substrate Bonding Studies Using y-APS Coupling Agent", IEEE Transactions on Components, Hybrids, and Manufacturing Technology, vol. CHMT-9, No. 4, p. 364-369, Dec. 1986.

Andreica V. et al., "High acid resistance packaging glass—consists of silica based mix with alkaline earth oxide{s} in specific proportions", WPI/Thomson, RO 83460 A; Mar. 30, 1984 (Abstract).

ASTM, "Standard Specification for Glasses in Laboratory Apparatus," Designation E438-92 (Reapproved 2006). Retrieved from the Internet: <URL: http://enterprise2.astm.org/DOWNLOAD/E438-92R06.1656713-1.pdf>, p. 1.

Benitez, et al., "SiOx—SiNx functional coatings by PECVD of organosilicon monomers other than silane", Annual Technical Conference Proceedings—Society of Vacuum Coaters (2002), 45th, 280-285; ISSN: 0731-1699.

Chao-Ching Chang et al., Synthesis and Optical Properties of Soluble Polyimide/Titania Hybrid Thin Films, Macromolecular Materials and Engineering, vol. 291, Issue 12, pp. 1521-1528, Dec. 8, 2006.

Chemical Resistance of Plastics and Elastomers, 4th edition, 7 pages, William Andrew Publishing, Plastics Design ibrary, 13 Eaton Avenue, Norwich, NY (2008).

Cho, et al. "Adhesion behavior of PDMS-containing polyimide to glass", Journal of Adhesion Science and Technology 12:3, pp. 253-269, Taylor & Francis (1998), DOI: 10.1163/156856198X00867.

Choi (Choi, et al., "Organic/Inorganic Imide Nanocomposites from Aminophenylsilsesquioxanes," Chem. Mater. 15 3365-3375, 2003).

Cichomski, M. et al., Investigation of the structure of fluoroalkylsilanes deposited on alumina surtace, Applied Surface Science, Jun. 18, 2012, vol. 258, No. 24, pp. 9849-9855.

Ciullo, P.A., Industrial Minerals and Their Uses—A Handbook and Formulary. William Andrew Publishing/Noyes, (1996). ISBN: 0-8155-1408-5. Online version available at: <URL: http:/app.knovel.com/hotlink/toc/id:kpIMTUAHFB/Industrial-minerals-their/industrial-minerals-their>, pp. 1-7.

De Rosa, et al., "Scratch Resistant Polymide Coatings for Aluminosilicate Glass Surfaces", The Journal of Adhesion, 78: 113-127, Taylor & Francis (2002), ISSN: 0021-8464.

Dean et al., "Pharmaceutical Packaging Technology", CRC Press, Nov. 2000, p. 149. (Year: 2000).

Definition of about pp. 1-8 from Oxford English Dictionary, Oxford University Press (Copyrights) 2015.

Dow Coming, "A Guide to Silane Solutions: Fiberglass and Composites", Silicones Simplified [online]. Dow Corning Corporation, 2009. Retrieved from the Internet: <URL: https://www.xiameter.com/en/ExploreSilicones/Documents/95-728-01%20Fiberglass%20and%20Composites.pdf>.

Dow Coming, Resins and Intermediates Selection Guide; Paints & Inks Solutions, p. 1-8, 2010.

DSC Eval of Epoxy and Polyimide-Impregnated Laminates, Pappalardo, JI of Applied Polymer Science vol. 21, 809-820 (1977).

DuPont Teflon PFA TE-7224 Aqueous Fluoropolymers made with Echelon Dispersion Technology [online]. Dupont, 2006. Retrieved from the Internet: <URL: http://www2.dupont.com/Teflon.sub.--Industrial/en.sub.—US/assets/downloa-ds/k15758.pdf>.

(56) References Cited

OTHER PUBLICATIONS

European Pharmacopeia, 5th edition, 3.2 Containers, [online]. Retrieved from the Internet: <URL: http://pharmacyebooks.com/2009/09/european-pharmacopoeia-5-0-online.html>, 4 Pages, (2005).
Extended European Search Report and Search Opinion; 17170001.6; Mailed Oct. 23, 2017; 8 Pages; European Patent Office.
Fiolax clear technical data sheet acquired from http://www.us.schott.com/d/tubing/7c1860b0-5313-4d48-a12f-fa1ac06bc4a9/schott-tubing-datasheet-fiolax-clear-english.pdf. Originally published online Feb. 2010, pp. 1-3.
Flaim, et al., "High Refractive Index Polymer Coatings for Optoelectronics Applications," Society of Photo-Optical Instrumentation for Engineers (2003), SPIE Proceedings of Optical Systems Design 2003, pp. 1-12.
Francen, et al., "Fluorochemical glass treatments", The Glass Industry (1965), 46(10), 594-7; 628-9; ISSN: 0017-1026.
G. L. Witucki, "A Silane Primer: Chemistry and Applications of Alkoxy Silanes", Journal of Coatings Technology, (vol. 65) pp. 57-60, Federation of Societies for Coatings Technology, Blue Bell, Pennsylvania (Jul. 1993).
Gunston, Bill (2009). Cambridge Aerospace Dictionary (2nd edition)—visible light. Cambridge University Press. 1 page.
Hasegawa et al., "Photophysics, photochemistry, and optical properties of polyimides", Elsevier Science Lid; Prog. Poly. Sci. 26 (2001), pp. 259-335.
Hawley's Condensed Chemical Dictionary Melting Points, 2007, pp. 1-5.
Huang, et al., "Cubic silsesquioxane-polymide nanocomposites with improved thermomerchanical and dielectric properties", Acta Materialia, Elsevier, vol. 53, No. 8, pp. 2395-2404, May 1, 2005; ISSN: 1359-6454.
Iacocca, et al., "Factors Affecting the Chemical Durability of Glass Used in the Pharmaceutical Industry", AAPS PharmSciTech, vol. 11, No. 3, pp. 1340-1349, Sep. 2010.
Jin, et al., "Preparation and characterization of poly(phthalazinone ether ketone)/SiO2 hybrid composite thin films with low friction coefficient", Journal of Sol-Gel Science and Technology, Springer Science+Business Media, LLC (2008), 46(2), 208-216; ISSN: 0928-0707.
Karlsson, S. et al., The technology of chemical glass strengthening—a review. Glass Technology: European Journal of Glass Science and Technology Part A, Apr. 30, 2010, vol. 51, No. 2, pp. 41-54.
Keramid and Kerimide 601, Scifinder American Chemical Society (ACS) (2015); pp. 1-5.
Iacocca, et al., "Factors affecting the chemical durability of glass used in the pharmaceutical industry," AAPS PharmSciTech, (11), 3, 2010, p. 1340-1349.
Liu et al., "Influences of heating temperature on mechanical properties of polydimethylsiloxane", Sensors and Actuators A: Physical, 2009, vol. 151, p. 42-45.
Liu, Y.H. et al., Tunable water-based lubrication behavior of alkyl- and fluoroalkyl-silanes, Chinese Science Bulletin, May 31, 2012, vol. 57, No. 15, pp. 1879-1885. doi: 10.1007/s11434-012-5106-2.
Lyophilization: Growing with Biotechnology, Genetic Engineering & Biotechnology News, Sep. 15, 2005, vol. 05, No. 16, acquired from https://www.genengnews.com/magazine/35/lyophilization-growing-with-biotechnology/ (Year: 2005). pp. 1-7.
Markarian, Jennifer, "Partnering to Address Particulates," Equipment and Processing Report, PharmTech.com, Issue 12, Oct. 6, 2015. [Online] Retrieved from the Internet: <URL: http://www.pharmtech.com/partnering-address-particulates>. p. 1.
McKeen, L., "Fatigue and Tribological Properties of Plastics and Elastomers," 2d Ed 7 Polyimides, (2010); 25 Pages.
Mennig et al., "Colored Coatings on Glass Based on Noble Metal Colloids", Sol-gel technologies for glass producers and users, 2004, 8 pages.
Metwalli et al., Journal of Colloid and Interface Science 298 (2006) 825-831.
Parylene Conformal Coating Specification and Properties acquired from https://www.nbtc.cornell.edu/sites/default/files/Parylene%20Information%20Sheets.pdf on Dec. 20, 2016.
Plueddemann, Edwin, "Silane Coupling Agents," Springer Science+Business Media, LLC (1982). ISBN: 978-1-4899-0344-0, pp. 1-18.
Poe, et al., "Zero CTE polyimides for athermal optical membranes", Proceedings of SPIE, vol. 7061, Issue: Novel Optical Systems Design and Optimization XI, pp. 706114/1-706114/9, Journal, 2008, Publisher: Society of Photo-Optical Instrumentation Engineers, ISSN: 0277-786X.
Polyimide—Hawley's Condensed Chemical Dictionary—Wiley Online(2007) Tyzor (Du Pont) Hawley's Condensed Chemical Dictionary Wiley Online (2007).
Qiu et al., "Morphology and size control of inorganic particles in polyimide hybrids by using SiO2—TiO2 mixed oxide", Polymer 44 (2003) 5821-5826.
Quinn, "NIST Recommended Practice Guide: Fractography of Ceramics and Glasses", Report No. 960-16, 2006, 557 pages.
Invitation to Pay Additional Fees and, Where Applicable, Protest Fee; PCT/US2021/049104; dated Dec. 21, 2021; 16 pages; European Patent Office.
International Search Report and Written Opinion of the International Searching Authority; PCT/US2021/049104; dated Mar. 9, 2022; pp. 24; European Patent Office.
Romero et al., Synthesis of aliphatic diamine and polytherimide with long perfluoroalkyl side chain, Journal of Fluorine Chemistry, 117 (2002) 27-33.
Rosa et al. "Scratch Resistant Polyimide Coatings for Aluminosilicate Glass Surfaces" The Journal of Adhesion, 78, 2002, p. 113-127.
Schmid, et al. "Recommendations on Delamination Risk Mitigation & Prediction for Type I Pharmaceutical Containers Made of Tubing Glass", Nuova Ompi: Glass Division, p. 40-42., 2012, Frederick Furness Publishing.
Schmid, et al., "Glass Delamination: Facts—Prevention—Recommendations", Stevanato Group Market Update, News Issue 5, May 2011, p. 1-4.
Schott Launches New Center of Excellence for Ready-to-use Pharma Packaging, Schott North America, Inc., Oct. 20, 2015. [Online] Retrieved from the Internet: <URL: http://www.us.schott.com/english/news/press.html?NID=us606>. pp. 1-2.
Scifinder CAS Registry No. 29158-17-6 ACS (2016), 1 page.
Smay, G. L., "The characteristics of high-temperature resistant organic polymers and the feasibility of their use as Jlass coating materials", Journal of Materials Science, 20 (4), pp. 1494-1500, Chapman & Hall Ind. (1985), ISSN: 0022-2461.
Synthesis of Aliphatic diamine and polyetherimide with Long Perfluoroalkyl Side Chain, Romero JI of Fluorine Chemistry 117 pp. 27-33 (2002) Scifinder CAS Registry No. 29158-17-6 ACS (2016).
The United States Pharmacopeial Convention; USP 39, <788> Particulate Matter In Injections/ Physical Tests; official from Dec. 1, 2016, pp. 608-611.
U.S. Pharmacopeia Convention Medicines Compendium, "<660> Containers-Glass" [online], (2014). Retrieved from the Internet: <URL: https://mc.usp.org/general-chapters>. pp. 1-5.
Wagner, Steven Robert, "High temperature-high humidity for polyimide coatings for aluminosilicale glass surfaces"; The Libraries at Alfred University; Scholes Library Catalog; (2001}, pp. 1-81; OCLC: 671453753.
Wahab, et al., "Silica- and Silsesquioxane-Containing Polymer Nanohybrids", Macromolecules Containing Metal and Metal-Like Elements, vol. 4: Group IVA Polymers, Chapter 6, 2005 John Wiley & Sons, Inc.
Yang-Yen Yu et al., High transparent polyimide/titania multi-layer anti-reflective hybrid films, Thin Solid Films 519 (2011) 4731-4736.
Zhen et al., "Widely Tunable Reflection-type Fabry-Perot Interferometer based on Relaxor Ferroelectric Poly(vinylidenefluoride-chlorotrifluoroethylenetrifluoroethylene)", Optics Express, vol. 16, No. 13, 2008, 6 pages.

\* cited by examiner

ULTRAVIOLET LIGHT-BLOCKING COATED PHARMACEUTICAL PACKAGES

CROSS-REFERENCE TO RELATED APPLICATIONS

This application claims priority to U.S. Provisional Patent Application No. 63/074,915, entitled "Ultraviolet Light-Blocking Coated Pharmaceutical Packages" and filed on Sep. 4, 2020, the entirety of which is incorporated by reference herein.

BACKGROUND

Field

The present specification generally relates to glass articles and, more specifically, to coating on glass articles such as pharmaceutical packages.

Technical Background

Historically, glass has been used as the preferred material for packaging pharmaceuticals because of its hermeticity, optical clarity, and excellent chemical durability relative to other materials. Some pharmaceutical compositions may be sensitive to ultraviolet light, and may be susceptible to degradation when exposed to ultraviolet light. Some glass compositions have been developed which at least partially block UV light. However, these glass compositions may have inferior properties with respect to, without limitation, glass delamination and/or outer surface coefficient of friction.

BRIEF SUMMARY OF SOME EMBODIMENTS

According to one or more embodiments, a coated pharmaceutical package may comprise a glass container comprising a first surface and a second surface opposite the first surface, wherein the first surface is an outer surface of the glass container, and wherein the glass container in an uncoated state has an average light transmittance in the UVB and UVC spectrum of at least 50% through a single wall of the coated package. The coated pharmaceutical package may further comprise a coating positioned over at least a portion of the first surface of the glass container, wherein the coated pharmaceutical package has an average light transmittance in the UVC spectrum of less than 50% through a single wall of the coated package, and wherein the coated pharmaceutical package has a light transmittance of less than 20% at all wavelengths from 400 nm to 450 nm.

According to one or more additional embodiments, a coated pharmaceutical package may comprise a glass container comprising a first surface and a second surface opposite the first surface, wherein the first surface is an outer surface of the glass container, and wherein the glass container in an uncoated state has an average light transmittance in the UVB and UVC spectrum of at least 50% through a single wall of the coated package. The coated pharmaceutical package may further comprise a coating positioned over at least a portion of the first surface of the glass container, wherein the coated package has an average light transmittance in the UVC spectrum of less than 50% through a single wall of the coated package, and wherein the coated pharmaceutical package is visibly colorless.

Additional features and advantages of the coatings that may be used for coating glass articles, coated glass articles, and methods and processes for manufacturing the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
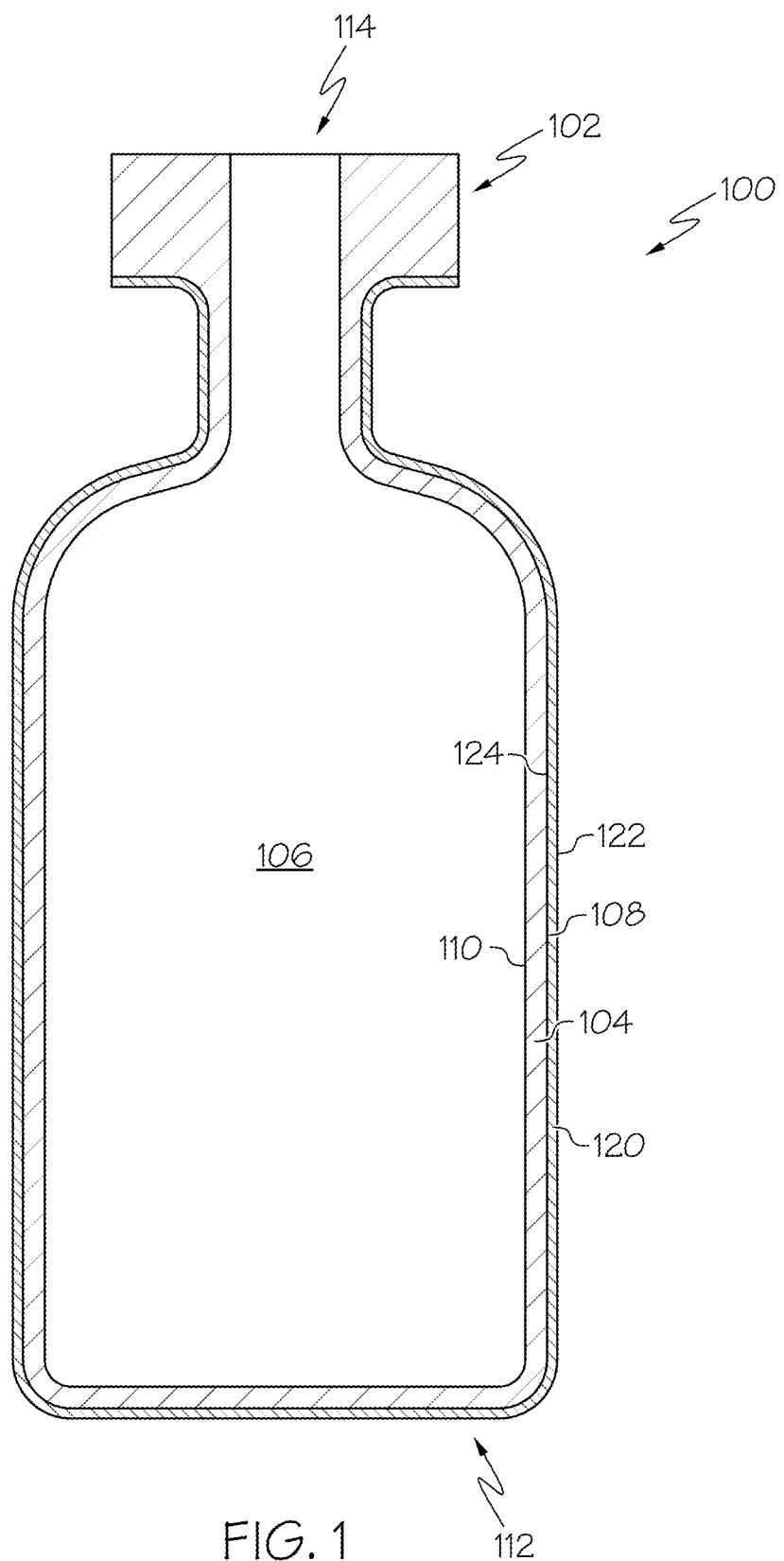
FIG. 1 schematically depicts a cross sectional view of a glass container with a coating, according to one or more embodiments shown and described herein.

Conventional glass pharmaceutical packages that are designed to block ultraviolet (sometimes described herein as "UV") transmission, such as amber glass containers, generally utilize glass compositions that function to block the UV light. That is the glass itself is responsible for blocking the UV light. Such glasses may contain pigmented materials, such as the case with amber glass compositions that not only appear colored in the visible spectrum, but also block UV light. Such conventional packages do not include coatings applied to the surface of the glass that serve to substantially affect UV transmission.

Described herein, according to one or more embodiments, are glass containers (such as pharmaceutical packages) that include coatings that block all or some of UV light. The containers, absent the coating, may not substantially block UV light to a degree desired. Such coatings allow for glass compositions to be utilized that do not block all UV light desired to be blocked. In some embodiments, the coatings may generally block UV light while allowing for the transmission of visible light. Such embodiments may be advantageous, in one or more embodiments, because "clear" glasses with improved properties may be utilized as opposed to traditional amber glass compositions and/or the coated glass containers may appear clear while being functional to block UV light. In additional embodiments, the coatings (as well as the coated articles) may appear colored and provide UV blocking functionality. These embodiments may be beneficial because "clear" glass containers may be utilized rather than colored glass containers, where colored glasses may be prone to glass degradation and/or may be more costly to produce in bulk. For example, switching between colored and non-colored glass in a single manufacturing set-up may be costly since much glass is wasted transitioning between the desired colored and non-colored glass compositions. The coating may additionally provide desirable properties such as reduced coefficient of friction as compared to the glass body surface, and may be thermally stable through depyrogenation, a heating process commonly employed in pharmaceutical filling.

Reference will now be made in detail to various embodiments of coatings, glass articles with coatings, and methods for producing the same, examples of which are schematically depicted in the figures. Such coated glass articles may be glass containers suitable for use in various packaging applications including, without limitation, as pharmaceutical packages. It should be understood that coated glass articles may refer to coated pharmaceutical packages as described in this disclosure. In one or more embodiments, the coatings and/or the coated pharmaceutical packages at least partially block the transmission of ultraviolet light into the container. However, the glass composition and/or the uncoated glass container may generally not have UV blocking properties that appreciably contribute to the UV blocking of the coated glass article. These pharmaceutical packages may or may not contain a pharmaceutical composition.

Various embodiments of the coatings, glass articles with coatings, and methods for forming the same will be described in further detail herein with specific reference to the appended drawings. While embodiments of the coatings described herein are applied to the outer surface of a glass container, it should be understood that the coatings described may be used as a coating on a wide variety of materials, including non-glass materials and on substrates other than containers including, without limitation, glass display panels and the like.

Generally, a coating may be applied to a surface of a glass article, such as a container that may be used as a pharmaceutical package. The coating may provide advantageous properties to the coated glass article such as UV light blocking, a reduced coefficient of friction, and increased damage resistance. The reduced coefficient of friction may impart improved strength and durability to the glass article by mitigating frictive damage to the glass. Further, the coating may maintain the aforementioned improved strength and durability characteristics following exposure to elevated temperatures and other conditions, such as those experienced during packaging and pre-packaging steps utilized in packaging pharmaceuticals, such as, for example, depyrogenation, lyophilization, autoclaving and the like. Accordingly, the coatings and glass articles with the coating may be thermally stable at conditions such as those utilized in depyrogenation.

FIG. 1 schematically depicts a cross section of a coated glass article, specifically a coated glass container 100. The coated glass container 100 comprises a glass body 102 and a coating 120. The glass body 102 has a glass container wall 104 extending between an exterior surface 108 (i.e., a first surface) and an interior surface 110 (i.e., a second surface). The interior surface 110 of the glass container wall 104 defines an interior volume 106 of the coated glass container 100. A coating 120 is positioned on at least a portion of the exterior surface 108 of the glass body 102. As used herein, a coating may be "positioned on" the exterior surface 108 while not in direct contact with the exterior surface 108, such as if an intermediate layer is present between the exterior surface 108 and a coating positioned over the exterior surface 108. In some embodiments, the coating 120 may be positioned on substantially the entire exterior surface 108 of the glass body 102. In some embodiments, such as depicted in FIG. 1, the coating 120 may be bonded to the glass body 102 at the exterior surface 108. In the embodiment of FIG. 1, the coating 120 has an outer surface 122 and a glass body contacting surface 124 at the interface of the glass body 102 and the coating 120.

In one embodiment, the coated glass container 100 is a pharmaceutical package. For example, the glass body 102 may be in the shape of a vial, ampoule, ampul, bottle, flask, phial, beaker, bucket, carafe, vat, syringe body, or the like. The coated glass container 100 may be used for containing any composition, and in one embodiment, may be used for containing a pharmaceutical composition. A pharmaceutical composition may include any chemical substance intended for use in the medical diagnosis, cure, treatment, or prevention of disease. Examples of pharmaceutical compositions include, but are not limited to, medicines, drugs, medications, medicaments, remedies, and the like. The pharmaceutical composition may be in the form of a liquid, solid, gel, suspension, powder, or the like.

Figure 2:
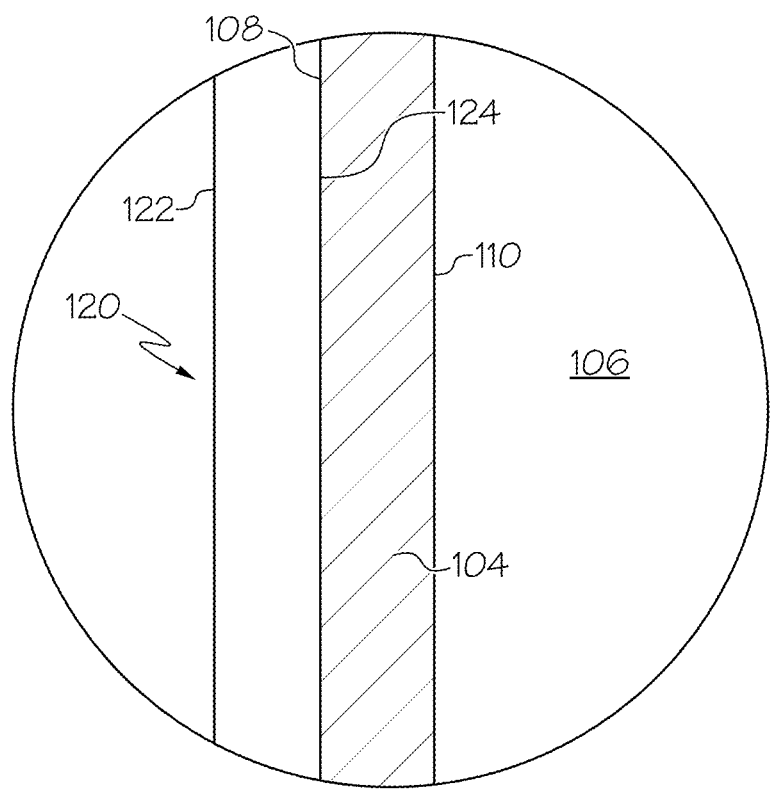
FIG. 2 schematically depicts an enlarged cross sectional view of the glass container of FIG. 1 with a coating, according to one or more embodiments shown and described herein.

Now referring to FIGS. 1 and 2, in one embodiment, the coating 120 comprises a single-layered structure. For example, the coating 120 may have a substantially homogenous composition comprising a polymer. If two or more components are included in the coating 120, the coating 120 may be mixed but not fully homogenous. For example, in one or more embodiments, one or more chemical constituents of the mixture may congregate at an interface of the coating 120 (e.g., the interface with the glass body 102 or the outer surface 122). In such an embodiment, the local concentration of a chemical constituent may differ over different areas of the coating 120. However, it should be understood that the term "mixed" as used herein refers to layers that have at least some dispersion of at least two chemical components, and includes layers that are not fully homogenous. Generally, a mixed layer is deposited as a mixture of two or more chemical constituents contained in a coating mixture. However, according to additional embodiments, the coating 120 may comprise two or more distinct layers. According to additional embodiments, the coating 120 may be multi-layered, having two or more distinct layers. For example, the coating 120 may include a coupling agent layer contacting the exterior surface 108 and a polymer layer over the coupling agent layer.

The transparency of the electromagnetic spectrum (i.e., light) through articles may be assessed by measuring the light transmission using a spectrophotometer. Measurements may be made through uncoated pharmaceutical containers, coated containers, and through planar glass sheets that are coated or uncoated.

In one or more embodiments, the glass body 102 may be transmissive of UV light (at least as compared with commercially available amber vials). The coating 120 may provide the majority of the UV blocking. Additionally, while the coating may provide UV blocking, in one or more embodiments, the coating may be transmissible to visible light such that it is not colored. In some embodiments, the coated glass container 100 may be transmissible to visible light but may block UV light. In other embodiments, the coated glass container may block some visible light (i.e., be colored) and may additionally block UV light. These light transmission properties are described quantitatively herein. As described herein, it should be appreciated that when UV light is "blocked" all or some UV light is blocked, and even in glass compositions that are said to not block UV light, some small amount of UV radiation may not be transmitted in all wavelengths.

As described herein, UV light (sometimes called light in the UV spectrum) refers to light having a wavelength of from 200 to 400 nm. UV light may include UVA light, UVB light, and UVC light. UVC light, as described herein, refers to light with a wavelength of from 200 to 290 nm. UVB light, as described herein, refers to light with a wavelength of from 290 to 320 nm. UVA light, as described herein, refers to light with a wavelength of from 320 to 400 nm. Visible light, as described herein, refers to light having wavelength of from 400 to 700 nm. As described herein, "average light transmittance" over a wavelength range refers to the average transmittance as could be determined by a spectrophotometer over a particular wavelength range. The "maximum light transmittance" over a wavelength range refers to the maximum transmittance at a single wavelength in the wavelength range.

Where light transmittance is described with respect to the glass composition, the glass container, or the glass wall, in an "uncoated state" a measurement may be attained by testing an uncoated container or glass substrate. Unless described otherwise herein, light transmittance is measured through a single wall of the coated glass container. Uncoated state refers to the glass article without a coating.

It should be understood that the described transmittances disclosed herein with respect to a coated glass container 100, a glass body 102 (uncoated), or a coating 120 may be measured through a coated or uncoated container (passing through two walls) or through a single wall of a container (coated or uncoated) or through a planar sheet of glass having a thickness similar to a pharmaceutical package (coated or uncoated). The light transmissibility of a coating 120 may be determined by measuring the light transmittance through the substrate material (e.g., the glass body 120) and the coated glass container 100, separately, and determining the difference between the two measured specimens.

According to one or more embodiments, the coated glass container 100 may have an average light transmittance in the UV spectrum of less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

According to one or more embodiments, the coated glass container 100 may have an average light transmittance in the UVA spectrum of less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

According to one or more embodiments, the coated glass container 100 may have an average light transmittance in the UVB spectrum of less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

According to one or more embodiments, the coated glass container 100 may have an average light transmittance in the UVC spectrum of less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

According to one or more embodiments, the coated glass container 100 may have a maximum light transmittance in the UV spectrum of less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

According to one or more embodiments, the coated glass container 100 may have a maximum light transmittance in the UVA spectrum of less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

According to one or more embodiments, the coated glass container 100 may have a maximum light transmittance in the UVB spectrum of less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

According to one or more embodiments, the coated glass container 100 may have a maximum light transmittance in the UVC spectrum of less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

According to one or more embodiments, the glass body 102 (uncoated) may have an average light transmittance in the UV spectrum of at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or even at least 99%.

According to one or more embodiments, the glass body 102 (uncoated) may have an average light transmittance in the UVA spectrum of at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or even at least 99%.

According to one or more embodiments, the glass body 102 (uncoated) may have an average light transmittance in the UVB spectrum of at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or even at least 99%.

According to one or more embodiments, the glass body 102 (uncoated) may have an average light transmittance in the UVC spectrum of at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or even at least 99%.

According to one or more embodiments, the glass body 102 (uncoated) may have a minimum light transmittance in the UV spectrum of at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or even at least 99%.

According to one or more embodiments, the glass body 102 (uncoated) may have a minimum light transmittance in the UVA spectrum of at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or even at least 99%.

According to one or more embodiments, the glass body 102 (uncoated) may have a minimum light transmittance in the UVB spectrum of at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or even at least 99%.

According to one or more embodiments, the glass body 102 (uncoated) may have a minimum light transmittance in the UVC spectrum of at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or even at least 99%.

According to one or more embodiments, the coating 120 may have an average light transmittance in the UV spectrum of less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

According to one or more embodiments, the coating 120 may have an average light transmittance in the UV spectrum of less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

According to one or more embodiments, the coating 120 may have an average light transmittance in the UVA spectrum of less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

According to one or more embodiments, the coating 120 may have an average light transmittance in the UVB spectrum of less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

According to one or more embodiments, the coating 120 may have an average light transmittance in the UVC spectrum of less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

According to one or more embodiments, the coating 120 may have a maximum light transmittance in the UV spectrum of less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

According to one or more embodiments, the coating 120 may have a maximum light transmittance in the UVA spectrum of less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

According to one or more embodiments, the coating 120 may have a maximum light transmittance in the UVB spectrum of less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

According to one or more embodiments, the coating 120 may have a maximum light transmittance in the UVC spectrum of less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 7.5%, less than or equal to 5%, less than or equal to 2.5%, or even less than or equal to 1%.

In one or more embodiments, the coated glass container 100 may meet the "Spectral Transmission for Colored Glass Containers" requirements of USP <660>. Generally, such standards are defined in USP <660> and utilize a UV-Vis spectrographic analysis whereby the wavelengths of from 290-450 nm are measured. In some embodiments, the coated glass container 100 may be perceived as colorless and transparent to the naked human eye when viewed at any angle. In some other embodiments, the coating 120 may have a perceptible tint, such as when the coating 120 comprises a polymer which is colored. In one or more embodiments, the light transmission through the coated glass container 100 is greater than or equal to about 55%, about 60%, about 65%, about 70%, about 75%, about 80%, or even about 90% of a light transmission through an uncoated glass container for wavelengths from about 400 nm to about 700 nm. However, in additional embodiments, the coated glass container 100 may be colored, such as amber, brown, or yellow in color.

In one or more embodiments, the coated glass container 100 may have protection from radiation of 400-450 nm wavelength, which is consistent with the standards of USP <660> described herein. For example, the coated glass container 100 may have a light transmittance of less than 20% at all wavelengths from 400 nm to 450 nm. In additional embodiments, the coated glass container 100 may have a light transmittance of less than 15%, less than 10%, or even less than 5%, at all wavelengths from 400 nm to 450 nm. In such embodiments, where the coating does not significantly block higher wavelength visible radiation, the coated glass container 100 may have an amber or brown perceivable color.

In one or more embodiments, the coated glass container 100 may have an average light transmittance in the visible spectrum of at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or even at least 99%. In additional embodiments, the glass body 102 may have such an average light transmittance in spectrums of from 400-450 nm, from 450-500 nm, from 500-550 nm, from 550-600 nm, from 600-650 nm, from 650-700 nm, or in any combination of these ranges.

In one or more embodiments, the coated glass article 100 may have a minimum light transmittance in the visible spectrum of at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or even at least 99%. In additional embodiments, the glass body 102 may have such a minimum light transmittance in spectrums of the ranges described for wavelength ranges of from 400-450 nm, from 450-500 nm, from 500-550 nm, from 550-600 nm, from 600-650 nm, from 650-700 nm, or in any combination of these ranges.

As described herein, a light transmission can be measured before an environmental treatment, such as a thermal treatment described herein, or after an environmental treatment. For example, following a heat treatment of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, or after exposure to lyophilization conditions, or after exposure to autoclave conditions, the disclosed optical transmission properties may be observed.

In one or more embodiments, the glass body 102 (uncoated) is visibly colorless, or is at least not colored like a traditional amber colored glass. For example, the glass body 102 in an uncoated state may be perceived as colorless and transparent to the naked human eye when viewed at any angle. As described herein, visibly colorless refers to no perceivable color by the average human eye. In one or more embodiments, the light transmission through the glass body 102 in an uncoated state may be greater than or equal to about 55%, about 60%, about 65%, about 70%, about 75%, about 80%, or even about 90% for all wavelengths in the visible spectrum. For reference, clear aluminosilicate or borosilicate glass has light transmission of about 87-88% for all wavelengths in the visible spectrum.

The coating 102 may possess a wide variety of compositions and structures. In some embodiments, coatings may be applied which provide UV blocking properties. In one or more embodiments, the coating may comprise a thickness sufficient to reduce ultraviolet light transmission. In one or more embodiments, the thickness of the coating sufficient to reduce ultraviolet light may be at least 10 nm. For example, the thickness of the coating may be at least 10 nm, at least, 20 nm, at least 30 nm, at least 40 nm, at least 50 nm, at least 60 nm, at least 70 nm, at least 80 nm, at least 90 nm, at least 100 nm, at least 200 nm, at least 300 nm, at least 400 nm, at least 500 nm, at least 600 nm, at least 700 nm, at least 800 nm, at least 900 nm, or even at least 1000 nm, at least 2 microns, at least 3 microns, at least 4 microns, at least 5 microns, at least 6 microns, at least 7 microns, at least 8 microns, at least 9 microns, at least 10 microns, at least 15 microns, at least 20 microns, or even at least 25 microns.

In one or more embodiments, the coating may comprise one or more polymers. In one or more embodiments, the one or more polymers may exhibit color detectable by the human eye when deposited at a thickness sufficient to reduce ultraviolet light transmission. In one or more embodiments the color may be a warm color. For example the coating may exhibit a red, yellow, orange, or amber color visible to the human eye.

In one or more embodiments the one or more polymers may provide a coating that is clear. In one or more embodiments, the coating may possess a clarity sufficient to allow for the automated visual inspection of the contents of a vial comprising the coating. The coating may also possess a clarity sufficient to allow for the manual inspection of the contents of the container, such as manual inspection by a medical professional or end point user. This may be particularly important for the detection of glass delamination within containers.

In one or more embodiments, the coating may be a visibly colored, thermally stable coating comprising a polymer such as a polyimide, and sometimes a coupling agent such as a silane or metal oxide. In some embodiments, the polymers and/or coupling agents may include a metal, such as silver, copper, iron, or combinations of these, that acts as a pigment and protects against at least UV light and produces the colored appearance. Coating that include copper, iron, and/or silver may have an amber or brown appearance, which may be needed to qualify under USP <660>. Examples of suitable coating systems that include polymers and/or coupling agents, into which the silver, copper, or iron may be incorporated, include those of U.S. Pat. No. 9,763,852 entitled "Glass Articles with Low-Friction Coatings," U.S. Patent Application Publication No. US 2017/0121058 A1 entitled "Glass Articles With Mixed Polymer and Metal Oxide Coatings," and U.S. Patent Application Publication No. US 2017/0088459 entitled "Halogenated Polyimide Siloxane Chemical Compositions and Glass Articles with Halogenated Polyimide Siloxane Low-Friction Coatings," the contents of which are incorporated by reference herein. As described herein, the metals that promote UV protection and visibly color the coatings may be incorporated into a polymer layer, a coupling agent layer, or a coating having a mixed coupling agent and polymer layer.

According to some embodiments, the coating material that is applied to the container, prior to any curing step, may include a polyimide in which colloidal metal particles are present. The colloidal metal particles may be suspended in the polyimide or polyamic acid solution or can be prepared in-situ inside the polymer layer by reduction of metal ions. In such embodiments, the coating may include a reducing agent. Contemplated metal ions are selected from silver ions, copper ions and iron ions. In the case of the in-situ reduction process, soluble metal ions are dissolved in the polyimide or polyamic acid solution in the presence of a reducing agent. This reducing agent can be omitted if the reduction of the metal ions is performed in a reducing atmosphere but addition of reducing agent is sometimes desired. For example, the addition of a reducing agent may be desired as the reduction can be done in a normal atmosphere such as air.

In embodiments described herein, the metal ions can be used in the form of inorganic salts such as nitrate salt, for example, or in the form of organic salts such as acetates. Silver trifuoroacetate and silver trifluoroacetylacetonate are particularly contemplated. However, other materials that include silver, copper, or iron may be suitable.

Examples of reducing agents include, without limitation, aminosilane such as N-[3-(Trimethoxysilyl)propyl] ethylenediamine, other aminosilane such aminopropyl tri ethoxysilane, aminopropyl trimethoxysilane, Bis [3-(trimethoxysilyl)propyl]amine, bis [3-(trimethoxysilyl)propyl] ethylenediamine, aminopropylsilsesquioxane, N-(2-Aminoethyl-3-aminopropyl) trimethoxysilane the list being not limitative. In some embodiments, the reducing agent may be a silane. In such embodiments, the reducing agent may act as a coupling agent in the coating, which may improve the adhesion of the polymer film to the glass.

In some embodiments, the coating may comprise the polymer that includes the copper, iron, or silver, in a polymer layer, where a coupling agent layer is present between the glass surface and the polymer layer. The coupling agent layer may include aminosilane such as aminopropyl silsesquioxane. In additional embodiments, the coupling agent material may be mixed in to the polymer along with the silver, copper, or iron.

In additional embodiments, the coating includes a coupling agent layer that includes one or more of silver, copper, or iron, and a polymer layer over the coupling agent layer. In such embodiments, the coupling agent layer may provide UV protection while the polymer layer may provide good coefficient of friction properties and good thermal properties. For example, the polymer layer may comprise a polyimide.

The UV-blocking coupling agent layer can be prepared by dispersing metal nanoparticles in a silane solution, for example, or can be made by forming the nanoparticle by in-situ reduction of metal ions. In the latter case, the metal ions may be dissolved in a solution containing the adhesion promoter, for example a silane, and at least one reducing agent. In some embodiments the reducing agent is coupling agent, such as a silane, that promotes adhesion. Such coupling agents acting as reducing agents can be selected, without limitation, among the aminosilanes such as as N-[3-(Trimethoxysilyl)propyl]ethylenediamine, gamma-aminopropyl triethoxysilane, gamma-aminopropyl trimethoxysilane, bis [3-(trimethoxysilyl)propyl]amine, and bis [3-(trimethoxysilyl)propyl]ethylenediamine, aminopropylsilsesquioxane.

According to additional embodiments, the coating may include a polyimide, one or more of silver, copper, or iron, as well as other metal oxides such as alumina, titania, or zirconia. For example, embodiments of coatings that include polyimide and one or more of alumina, titania, or zirconia are disclosed in U.S. Patent Application Publication No. US 2017/0121058 A1 entitled "Glass Articles with Mixed Polymer and Metal Oxide Coatings." It should be appreciated that other metal oxides may be utilized besides alumina, titania, and zirconia, which may reduce some UV transmission but do not generally affect visible color of the coating.

In one or more further embodiments, the one or more polymer may comprise a polyimide or other thermally stable polymer that blocks UV radiation without the use of pigmenting metals such as silver, copper, or iron. For example, the polymer may comprise PMDA-ODA polyimide.

In one or more embodiments the coating may comprise a Bragg mirror. As described herein, a "Bragg mirror" is a layered material that causes the reflection of oncoming light using alternating layers of high and low refractive index material. In one or more embodiments, the Bragg mirror may comprise at least one layer of high refractive index material and at least one layer of low refractive index material. The difference in refractive index between the high refractive index material and the low refractive index material may be at least 0.5. For example, the difference in refractive index between the high refractive index material and the low refractive index material may be at least 0.5, at least 0.6, at least 0.7, at least 0.8, at least 0.9 or even at least 1.0.

In one or more embodiments, the high refractive index layer may comprise any material with a refractive index that is greater than the refractive index of the low refractive index material by at least 0.5. In one or more embodiments, the high refractive index material may comprise a metal oxide. For example, the high refractive index layer may comprise titania ($TiO_2$), zirconia ($ZrO_2$), or alumina ($AlO_2$). In one or more embodiments, the high refractive index layer may comprise $TiO_2$. Examples of layers that include titania, zirconia, or alumina in a polyimide matrix are described in U.S. Patent Application Publication No. US 2017/0121058 entitled "Glass Articles with Mixed Polymer and Metal Oxide Coatings."

In one or more embodiments, the low refractive index layer may comprise a material with a refractive index that is less than the refractive index of the high refractive index material by at least 0.5. In one or more embodiments, the low refractive index material may comprise or consist of polyimide that is visibly colorless. In additional embodiments, the low refractive index material may comprise a fluorinated compound. In one or more embodiments, the low refractive index material may comprise a silica compound. For example, the low refractive index material may comprise $SiO_2$.

In one or more embodiments, the Bragg mirror may comprise alternating layers. The alternating layers may be high refractive index layers and low refractive index layers. In one or more embodiments adjacent layers of the Bragg mirror may have a difference in refractive index of at least 0.5. For example, the coating may comprise a first high refractive index layer, a first low refractive index layer, and a second high refractive index layer, where the first low refractive index layer is positioned between the first and second high refractive index layers.

In one or more embodiments, the alternating high and low refractive index layers of the Bragg mirror may reflect ultraviolet light. Without wishing to be bound by theory, each layer boundary may cause a partial reflection of waves within a range of wavelengths. In one or more embodiments, the partial wave reflections may create constructive interference to enhance the reflection of light in one or more wavelengths. In one or more embodiments, the thickness of the alternating high and low refractive index layers may be optimized to enhance the reflection of one or more desired wavelengths. In one or more embodiments, the range of wavelengths reflected by the Bragg mirror may include wavelengths comprising ultraviolet light.

In one or more embodiments, the coating may comprise a high pass filter. As described herein, a "high pass filter" may be a material that transmits light comprising longer wavelengths than a certain cutoff wavelength. In one or more embodiments, at least one the high refractive index layer and at least one low refractive index layer may be positioned to form a high pass filter. In one or more embodiments, ultraviolet light may comprise wavelengths below the cutoff wavelength of the high pass filter. In one or more embodiments, the high pass filter may transmit visible light and reduce the transmission of ultraviolet light through the coating. For example, the cutoff wavelength may be 400 nm, which may allow the transmission of visible light but prevent the transmission of ultraviolet light.

According to one or more embodiments, the coating may include a mixed layer of polyimide and one or more of titania, zirconium, or aluminum, as described herein. Over this layer may be positioned a layer of polyimide that does not include substantial amounts of metal oxides (less than 1 wt. %, or even 0 wt. %). In such embodiments, a Bragg mirror and/or high pass filter functionality may be formed.

In one or more embodiments, the high pass filter may be a Fabry Perot cavity. As described herein, a "Fabry Perot cavity" is a structure that may comprise two parallel reflecting surfaces and may prevent the transmission of light having wavelengths that are not in resonance with the Fabry Perot cavity. In one or more embodiments, a Fabry Perot cavity may be formed from at least one high refractive index layer, at least one absorbing layer, and at least one low refractive index layer. For example, the Fabry Perot cavity may comprise a high refractive index layer and a low refractive index layer separated by an absorbing layer. The reflective surfaces of the Fabry Perot cavity may be located at the interface between the absorbing layer and the high or low refractive index layers. In one or more embodiments, the Fabry Perot Cavity may reduce the transmission of ultraviolet light through the coating. Such embodiments may include alternating layers of mixed polyimide and metal oxide layers and polyimide layers, as described herein.

In one or more embodiments, the coating may comprise a continuous phase and a non-continuous phase. The non-continuous phase may comprise bodies or inclusions within the continuous phase. In one or more embodiments, the difference in refractive index between the one or more materials of the continuous phase and the one or more materials of the non-continuous phase may be at least 0.5. For example, the difference in refractive index between the one or more materials of the continuous phase and the one or more materials of the non-continuous phase may be at least 0.5, at least 0.6, at least 0.7, at least 0.8, at least 0.9 or even at least 1.0. Without wishing to be bound by theory, the difference in refractive index between the continuous phase and non-continuous phase may lead to the reflection and scattering of light, which may include ultraviolet light. It is contemplated that the coating comprising a continuous phase and a non-continuous phase may be optimized for ultraviolet light reflection and scattering by adjusting the thickness of the coating, the size of the inclusions, the shape of the inclusions, and the distribution of the inclusions.

In one or more embodiments the one or more materials comprising the continuous phase may absorb at least 50% more ultraviolet light than visible light. For example, the one or more In one or more embodiments, the materials comprising the continuous phase may absorb at least 50%, at least 60%, at least 70%, at least 80%, or even at least 90% more ultraviolet light than visible light. In one or more embodiments, the continuous phase may comprise metal oxide. For example, the continuous phase may comprise $TiO_2$, $ZrO_2$, $Al_2O_3$, or combinations of these. In at least one embodiment, the continuous phase may comprise $TiO_2$.

In one or more embodiments, the non-continuous phase may comprise one or more polymers or one or more inorganic particles. In one or more embodiments, the one or more polymers may comprise a polyimide. In one or more embodiments, the inorganic particles may be hollow.

Figure 4:
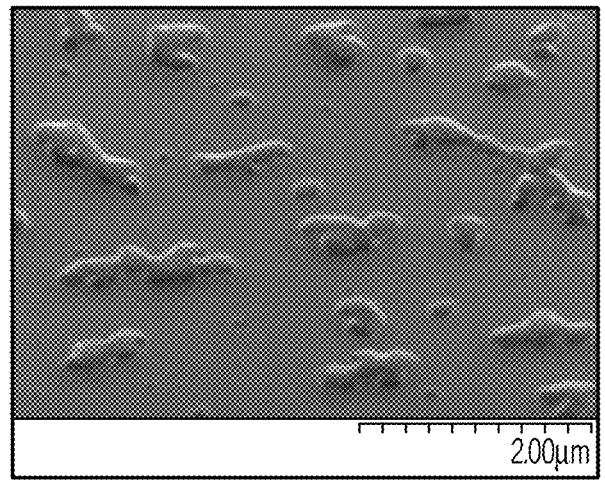
FIGS. 4 and 5 depict scanning electron microscope images of coatings herein, according to one or more embodiments shown and described herein.
Figure 5:
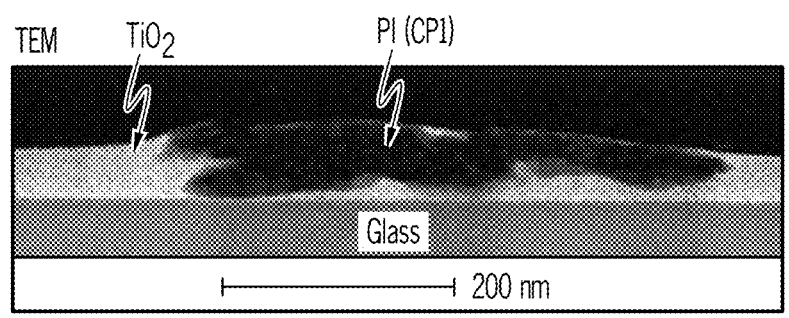

In one or more further embodiments, the coating may comprise a $TiO_2$ continuous phase and polyimide inclusions in a non-continuous phase. FIG. 4 and FIG. 5 display a coating comprising polyimide inclusions in a continuous $TiO_2$ coating. In one or more embodiments, the irregular shapes of the polyimide inclusions and the difference in refractive index between the $TiO_2$ and the polyimide may aid in the reflection and scattering of light.

In one or more embodiments, the coating may comprise cavities, where the refractive index of the coating is at least 0.5 greater than the refractive index of the cavity. For example the refractive index of the coating may be at least 0.5, at least 0.6, at least 0.7, at least 0.8, at least 0.9 or even at least 1.0 greater than the refractive index of the cavity.

In one or more embodiments, the cavities may be formed by the decomposition or volatilization of a sacrificial material. As described herein, a "sacrificial material" is a material that decomposes or volatilizes during a thermal curing process. In one or more embodiments, sacrificial material may be introduced into the coating during the coating process and before a thermal curing process. Subsequently, the sacrificial material may create cavities in the coating during a thermal curing process. In one or more embodiments, the difference between the refractive index of the coating and the refractive index of the cavity may result in light reflection and scattering. In one or more embodiments, the difference between the refractive index of the coating and the cavity may result in the reflection and scattering of ultraviolet light.

In one or more embodiments, the coating may comprise a layer having a thickness of at least 10 nm, wherein the layer comprises a material that absorbs at least 50% more ultraviolet light than visible light. For example, the layer may have a thickness of at least 10 nm, at least, 20 nm, at least 30 nm, at least 40 nm, at least 50 nm, at least 60 nm, at least 70 nm, at least 80 nm, at least 90 nm, at least 100 nm, at least 200 nm, at least 300 nm, at least 400 nm, at least 500 nm, at least 600 nm, at least 700 nm, at least 800 nm, at least 900 nm, or even at least 1000 nm. In further examples, the layer may comprise a material that absorbs at least 50%, at least 60%, at least 70%, at least 80%, or even at least 90% more ultraviolet light than visible light.

Figure 6:
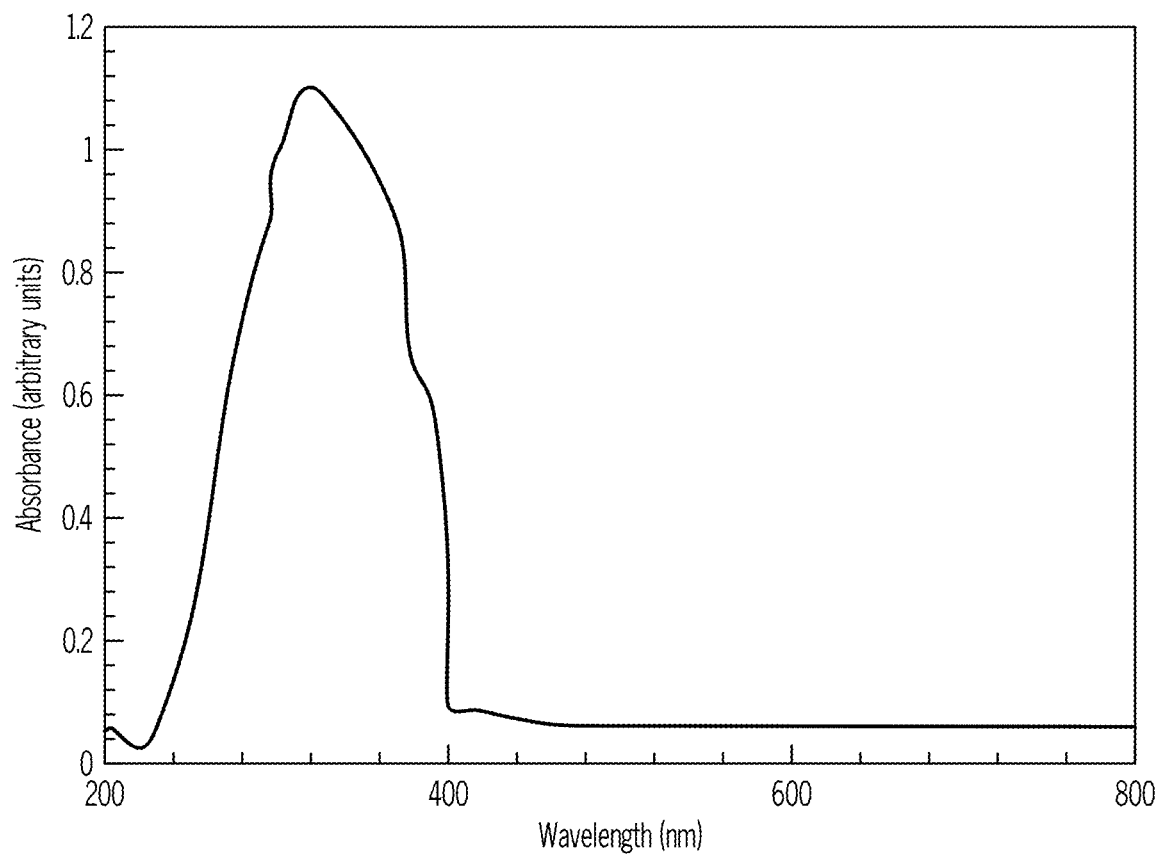
FIG. 6 depicts a light absorbance spectrum of a metal oxide layer or sublayer, according to one or more embodiments shown and described herein.

In one or more embodiments, the layer may comprise a metal oxide. For example, the layer may comprise one or more of $TiO_2$, $ZrO_2$, and $Al_2O_3$. In one or more embodiments, the coating may comprise $TiO_2$. In one or more embodiments, the $TiO_2$ may have a high absorbance of ultraviolet light with a wavelength between 250 and 400 nm as shown in the UV-Vis absorption spectrum for $TiO_2$ displayed in FIG. 6. In one or more embodiments, the thickness of the $TiO_2$ layer may be adjusted to increase the ultraviolet light absorbing properties of the coating. For example, in one or more embodiments, as the thickness of the $TiO_2$ layer increases, the absorbance of ultraviolet light by the $TiO_2$ layer may increase.

In one or more embodiments, the coating may comprise one or more compounds that absorb ultraviolet light and dissipate at least 50% of the energy absorbed from ultraviolet light as heat. For example, the compounds may absorb ultraviolet light and dissipate at least 50%, at least 60%, at least 70%, at least 80%, at least 90%, or even at least 99% of the energy absorbed from ultraviolet light as heat. In one or more embodiments, these compounds may include benzophenones, benzotriazoles, triazines, and oxalanilides.

In one or more embodiments, the coating may comprise one or more photochromic compounds. As described herein, "photochromic compounds" may be compounds that have an absorption spectrum that changes when the photochromic compound is exposed to ultraviolet light. In one or more embodiments, the absorption spectrum of the photochromic compound may change such that the absorption of ultraviolet light increases when the photochromic compound is exposed to ultraviolet light. In one or more embodiments, the photochromic compound that has been exposed to ultraviolet light and has undergone an adsorption spectrum change may revert to its original absorption spectrum when the exposure to ultraviolet light ceases. An example photochromic compound is made by Nemoto Lumi Materials Company, Kanagawa Japan YS-A4 and is a red pigmented dye that may be white in color, absorb UV light, and transmit red light.

In one or more embodiments, the photochromic compounds may comprise a first absorption spectrum and a second absorption spectrum where the photochromic compounds exhibit the second absorption spectrum when exposed to ultraviolet light of a sufficient intensity for a sufficient length of time. In one or more embodiments, the intensity of ultraviolet light and length of time necessary for the photochromic compound to exhibit a second absorption spectrum may vary depending on the photochromic compound being used. In one or more embodiments, sunlight may provide ultraviolet light of sufficient intensity for the photochromic compound to exhibit a second absorption spectrum. In one or more embodiments, the necessary length of time may be 0.5 seconds to 20 minutes. For example, the necessary length of time may be from 0.5 seconds to 20 minutes, from 0.5 seconds to 15 minutes, from 0.5 seconds to 10 minutes, from 0.5 seconds to 9 minutes, from 0.5 seconds to 8 minutes, from 0.5 seconds to 7 minutes, from 0.5 seconds to 6 minutes, from 0.5 seconds to 5 minutes, from 0.5 seconds to 4 minutes, from 0.5 seconds to 3 minutes, from 0.5 seconds to 2 minutes, from 0.5 seconds to 1 minute, from 0.5 seconds to 50 seconds, from 0.5 seconds to 40 seconds, from 0.5 seconds to 30 seconds, from 0.5 seconds to 20, seconds, from 0.5 seconds to 10 seconds, from 0.5 seconds to 5 seconds, or even from 0.5 seconds to 1 second. In one or more embodiments, the second absorption spectrum may absorb at least 5% more ultraviolet light than the first absorption spectrum. For example, the second absorption spectrum may absorb at least 5%, at least 10%, at least 20%, at least 30%, at least 40%, at least 50%, at least 60%, at least 70%, at least 80%, at least 90%, or even at least 99% more ultraviolet light than the first absorption spectrum.

In one or more embodiments, the molecules of the photochromic compounds may undergo a conformational change when the photochromic material is exposed to ultraviolet light. This conformational change may cause a change in the absorption spectrum of the photochromic compounds.

In one or more embodiments, the photochromic compound may absorb more visible light when exposed to ultraviolet light. This may cause the coating to darken or develop color when exposed to ultraviolet light. In one or more embodiments, this coloring is reversible and disappears when the coating is no longer exposed to ultraviolet light.

In one or more embodiments, photochromic compounds may be organic compounds or inorganic compounds. For example, the one or more photochromic compounds may be hexaarylbiimidaxoles, diarylethenes, photochromic quinones, or zinc compounds. Additionally, other suitable photochromic compounds known in the art may be used in the coating, including photochromic compounds suitable for use in transition lenses for eyeglasses.

In one or more embodiments, the one or more layers comprising the coating may be applied to a vial surface by spray coating. In one or more embodiments, spray coating may be a suitable method for depositing a polymer, a polyimide, PMDA-ODA, a high refractive index layer, a low refractive index layer, an absorbing layer, a metal oxide layer, a titania layer, an alumina layer, a zirconia layer, a silica layer, a layer comprising a continuous phase and a non-continuous phase, a continuous layer comprising a sacrificial material, a layer comprising a photochromic compound and combinations of these. In one or more embodiments spray coating may be suitable for depositing a layer at least 10 nm thick. For example, spray coating may be suitable for depositing a layer at least 10 nm, at least, 20 nm, at least 30 nm, at least 40 nm, at least 50 nm, at least 60 nm, at least 70 nm, at least 80 nm, at least 90 nm, at least 100 nm, at least 200 nm, at least 300 nm, at least 400 nm, at least 500 nm, at least 600 nm, at least 700 nm, at least 800 nm, at least 900 nm, or even at least 1000 nm thick.

Referring again to FIGS. 1 and 2, the coating 120 may be applied in a single deposition step where the coating 120 comprises a single layer. Deposition may be by a submersion process, or alternatively, the coating 120 may be applied by a spray or other suitable means, and optionally dried. A description of suitable deposition methods for the coatings 120 described herein may be found in U.S. Pat. No. 9,763,852 entitled "Glass Articles with Low-Friction Coatings," which is incorporated by reference in its entirety herein. In additional embodiments, multiple depositions may be utilized. For example, multiple coating precursor depositions may be performed and then cured, or curing may follow each deposition step, such that a second coating of precursor is applied onto a cured layer.

In one or more embodiments, the coating 120 applied to the glass body 102 may have a thickness of less than or equal to about 100 µm, less than or equal to about 10 µm, less than or equal to about 8 µm, less than or equal to about 6 µm, less than or equal to about 4 µm, less than or equal to about 3 µm, less than or equal to about 2 µm, or even less than or equal to about 1 µm. In some embodiments, the thickness of the coating 120 may be less than or equal to about 800 nm, less than or equal to about 600 nm, less than or equal to about 400 nm 300 nm, less than or equal to about 200 nm, or even less than or equal to about 100 nm thick. In other embodiments, the coating 120 may be less than about 90 nm thick, less than about 80 nm thick, less than about 70 nm thick, less than about 60 nm thick, less than about 50 nm, or even less than about 25 nm thick. In embodiments, the coating 120 may have a thickness of at least about 10 nm, at least about 15 nm, at least about 20 nm, at least about 25 nm, at least about 30 nm, at least about 35 nm, at least about 40 nm, or even at least about 45 nm. Exemplary embodiments may have a thickness of from about 20 nm to about 50 nm, from about 25 nm to about 45 nm, or from about 30 nm to about 40 nm. Without being bound by theory, it is believed that relatively thin coatings (i.e., less than 20 nm) may not adequately protect the glass, resulting in checking on the glass surface during vial-to-vial contact. In addition such relatively thin coatings may not survive a depyrogenation process. On the other hand, relatively thick coatings (i.e., greater than 50 nm) may be more easily damaged and wear tracks in the coating may appear from vial-on-vial contacting. It should be noted that in the case of the relatively thick coatings, the wear tracks are believed to be deformations in the coating, and not in the glass. As described herein, wear tracks are visible tracks caused by abrasion on a coating, leaving a track or scuff. In some embodiments, wear tracks may signify glass checking and/or relatively high coefficient of friction (e.g., 0.7 or greater).

In some embodiments, the coating 120 may not be of uniform thickness over the entirety of the glass body 102. For example, the coated glass container 100 may have a thicker coating 120 in some areas, due to the process of contacting the glass body 102 with one or more coating solutions that form the coating 120. In some embodiments, the coating 120 may have a non-uniform thickness. For example, the coating thickness may be varied over different regions of a coated glass container 100, which may promote protection in a selected region.

The glass containers of the pharmaceutical packages, to which the coating 120 may be applied, may be formed from a variety of different glass compositions. The specific composition of the glass article may be selected according to the specific application such that the glass has a desired set of physical properties. According to one or more embodiments, the glass may be a composition which is known to exhibit chemical durability and low thermal expansion, such as alkali borosilicate glasses. According to another embodiment, may be formed from a Type I, Class B glass according to ASTM Standard E438-92.

The glass containers may be formed from a glass composition which has a coefficient of thermal expansion in the range from about $25 \times 10^{-7}/°C$. to $80 \times 10^{-7}/°C$. For example, in some embodiments described herein, the glass body 102 is formed from alkali aluminosilicate glass compositions which are amenable to strengthening by ion exchange. Such compositions generally include a combination of $SiO_2$, $Al_2O_3$, at least one alkaline earth oxide, and one or more alkali oxides, such as $Na_2O$ and/or $K_2O$. In some of these embodiments, the glass composition may be free from boron and compounds containing boron. In some other embodiments the glass compositions may further comprise minor amounts of one or more additional oxides such as, for example, $SnO_2$, $ZrO_2$, $ZnO$, $TiO_2$, $As_2O_3$, or the like. These components may be added as fining agents and/or to further enhance the chemical durability of the glass composition. In another embodiment, the glass surface may comprise a metal oxide coating comprising $SnO_2$, $ZrO_2$, $ZnO$, $TiO_2$, $As_2O_3$, or the like.

In some embodiments described herein, the glass body 102 is strengthened such as by ion-exchange strengthening, herein referred to as "ion-exchanged glass". For example, the glass body 102 may have a compressive stress of greater than or equal to about 300 MPa or even greater than or equal to about 350 MPa. In some embodiments, the compressive stress may be in a range from about 300 MPa to about 900 MPa. However, it should be understood that, in some embodiments, the compressive stress in the glass may be less than 300 MPa or greater than 900 MPa. In some embodiments, the glass body 102 may have a depth of layer greater than or equal to 20 µm. In some of these embodiments, the depth of layer may be greater than 50 µm or even greater than or equal to 75 µm. In still other embodiments, the depth of the layer may be up to or greater than 100 µm. The ion-exchange strengthening may be performed in a molten salt bath maintained at temperatures from about 350°

C. to about 500° C. To achieve the desired compressive stress, the glass container (uncoated) may be immersed in the salt bath for less than about 30 hours or even less than about 20 hours. For example, in one embodiment the glass container is immersed in a 100% $KNO_3$ salt bath at 450° C. for about 8 hours.

In one particularly exemplary embodiment, the glass body 102 may be formed from an ion exchangeable glass composition described in pending U.S. patent application Ser. No. 13/660,894 filed Oct. 25, 2012, and entitled "Glass Compositions with Improved Chemical and Mechanical Durability" assigned to Corning, Incorporated.

However it should be understood that the coated glass containers 100 described herein may be formed from other glass compositions including, without limitation, ion-exchangeable glass compositions and non-ion exchangeable glass compositions. For example, in some embodiments the glass container may be formed from Type 1B glass compositions such as, for example, Schott Type 1B borosilicate glass.

In some embodiments described herein, the glass article may be formed from a glass composition which meets the criteria for pharmaceutical glasses described by regulatory agencies such as the USP (United States Pharmacopoeia), the EP (European Pharmacopeia), and the JP (Japanese Pharmacopeia) based on their hydrolytic resistance. Per USP 660 and EP 7, borosilicate glasses meet the Type I criteria and are routinely used for parenteral packaging. Examples of borosilicate glass include, but are not limited to, Corning® Pyrex® 7740, 7800 and Wheaton 180, 200, and 400, Schott Duran®, Schott Fiolax®, KIMAX® N-51A, Gerrescheimer GX-51 Flint and others. Soda-lime glass meets the Type III criteria and is acceptable in packaging of dry powders which are subsequently dissolved to make solutions or buffers. Type III glasses are also suitable for packaging liquid formulations that prove to be insensitive to alkali. Examples of Type III soda lime glass include Wheaton 800 and 900. De-alkalized soda-lime glasses have higher levels of sodium hydroxide and calcium oxide and meet the Type II criteria. These glasses are less resistant to leaching than Type I glasses but more resistant than Type III glasses. Type II glasses can be used for products that remain below a pH of 7 for their shelf life. Examples include ammonium sulfate treated soda lime glasses. These pharmaceutical glasses have varied chemical compositions and have a coefficient of linear thermal expansion (CTE) in the range of $20-85 \times 10^{-7}/°C$.

When the coated glass articles described herein are glass containers, the glass body 102 of the coated glass containers 100 may take on a variety of different forms. For example, the glass bodies described herein may be used to form coated glass containers 100 such as vials, ampoules, cartridges, syringe bodies and/or any other glass container for storing pharmaceutical compositions. Moreover, the ability to chemically strengthen the glass containers prior to coating can be utilized to further improve the mechanical durability of the glass containers. Accordingly, it should be understood that, in at least one embodiment, the glass containers may be ion exchange strengthened prior to application of the coating. Alternatively, other strengthening methods such as heat tempering, flame polishing, and laminating, as described in U.S. Pat. No. 7,201,965, could be used to strengthen the glass before coating.

Various properties of the coated glass containers (i.e., coefficient of friction, horizontal compression strength, 4-point bend strength) may be measured when the coated glass containers are in an as-coated condition (i.e., following application of the coating without any additional treatments other than curing if applicable) or following one or more processing treatments, such as those similar or identical to treatments performed on a pharmaceutical filling line, including, without limitation, washing, lyophilization, depyrogenation, autoclaving, or the like.

Depyrogenation is a process wherein pyrogens are removed from a substance. Depyrogenation of glass articles, such as pharmaceutical packages, can be performed by a thermal treatment applied to a sample in which the sample is heated to an elevated temperature for a period of time. For example, depyrogenation may include heating a glass container to a temperature of between about 250° C. and about 380° C. for a time period from about 30 seconds to about 72 hours, including, without limitation, 20 minutes, 30 minutes 40 minutes, 1 hour, 2 hours, 4 hours, 8 hours, 12 hours, 24 hours, 48 hours, and 72 hours. Following the thermal treatment, the glass container is cooled to room temperature. One conventional depyrogenation condition commonly employed in the pharmaceutical industry is thermal treatment at a temperature of about 250° C. for about 30 minutes. However, it is contemplated that the time of thermal treatment may be reduced if higher temperatures are utilized. The coated glass containers, as described herein, may be exposed to elevated temperatures for a period of time. The elevated temperatures and time periods of heating described herein may or may not be sufficient to depyrogenate a glass container. However, it should be understood that some of the temperatures and times of heating described herein are sufficient to depyrogenate a coated glass container, such as the coated glass containers described herein. For example, as described herein, the coated glass containers may be exposed to temperatures of about 250° C., about 260° C. about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. It is recognized that depyrogenation processes may have times other than 30 minutes, and 30 minutes is used throughout this disclosure with a depyrogenation temperature for comparative purposes such as, for example, coefficient of friction testing following exposure to a defined depyrogenation condition.

As used herein, lyophilization conditions (i.e., freeze drying) refer to a process in which a sample is filled with a liquid that contains protein and then frozen at low temperatures, such as −100° C., followed by water sublimation for a time such as 20 hours at a temperatures such as −15° C. under vacuum.

As used herein, autoclave conditions refer to steam purging a sample for a time period such as 10 minutes at 100° C., followed by a 20 minute dwelling period wherein the sample is exposed to a 121° C. environment, followed by 30 minutes of heat treatment at 121° C.

The coefficient of friction ($\mu$) of the portion of the coated glass container with the coating may have a lower coefficient of friction than a surface of an uncoated glass container formed from a same glass composition. A coefficient of friction ($\mu$) is a quantitative measurement of the friction between two surfaces and is a function of the mechanical and chemical properties of the first and second surfaces, including surface roughness, as well as environmental conditions such as, but not limited to, temperature and humidity. As used herein, a coefficient of friction measurement for coated glass container 100 is reported as the coefficient of friction between the outer surface of a first glass container (having an outer diameter of between about 16.00 mm and about 17.00 mm) and the outer surface of second glass container which is substantially identical to the first glass container, wherein the first and second glass containers have the same body and the same coating composition (when applied) and have been exposed to the same environments prior to fabrication, during fabrication, and after fabrication. Unless otherwise denoted herein, the coefficient of friction refers to the maximum coefficient of friction measured with a normal load of 30 N measured on a vial-on-vial testing jig, as described herein. However, it should be understood that a coated glass container which exhibits a maximum coefficient of friction at a specific applied load will also exhibit the same or better (i.e., lower) maximum coefficient of friction at a lesser load. For example, if a coated glass container exhibits a maximum coefficient of friction of 0.5 or lower under an applied load of 50 N, the coated glass container will also exhibit a maximum coefficient of friction of 0.5 or lower under an applied load of 25 N. To measure a maximum coefficient of friction, local maxima at or near the beginning of the test are excluded, as such maxima at or near the beginning of the test represent static coefficient of friction. As described in the embodiments herein, the coefficient of friction was measured where the speed of the containers relative to one another was about 0.67 mm/s.

Figure 3:
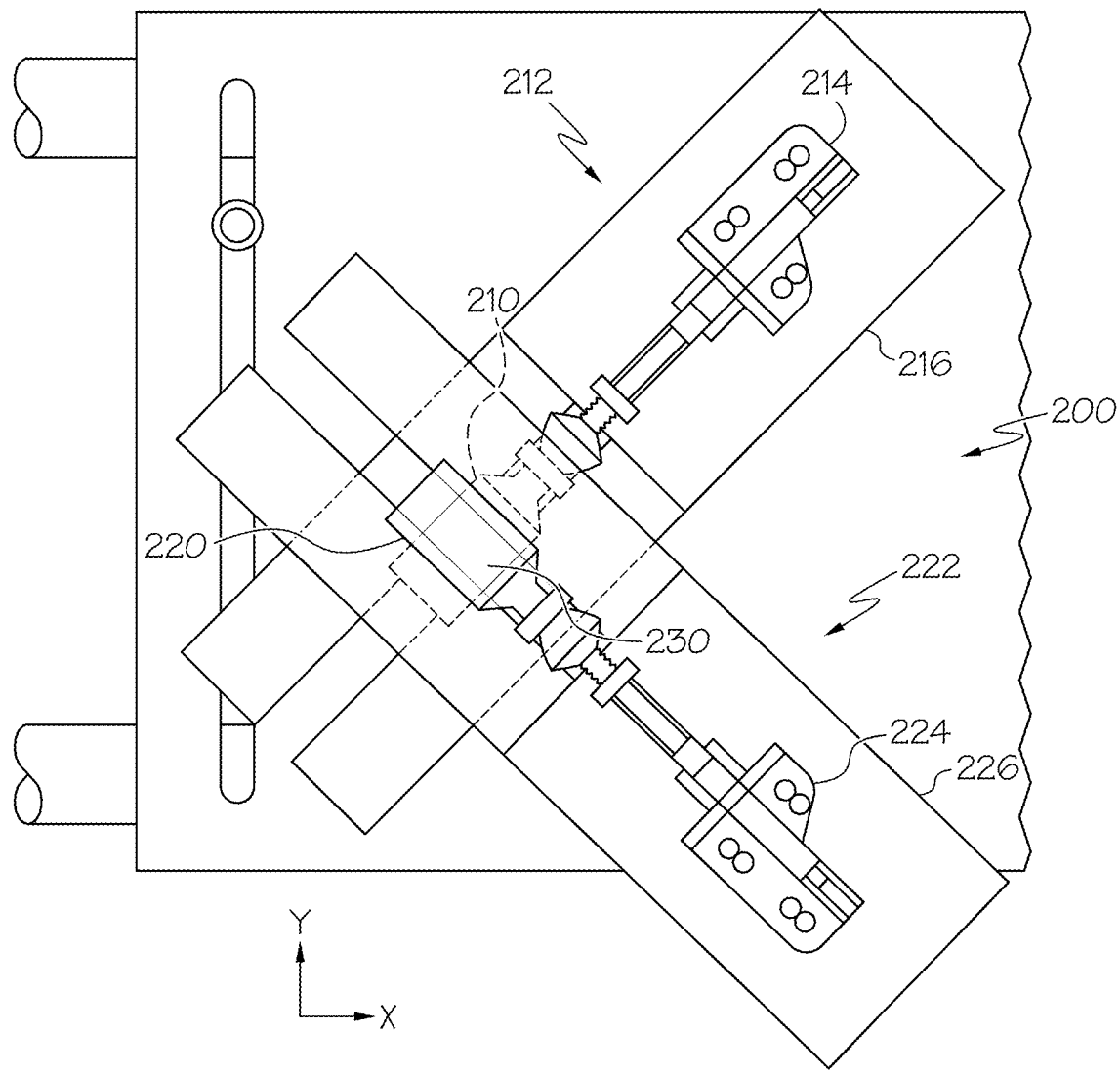
FIG. 3 schematically depicts a testing jig for determining the coefficient of friction between two surfaces, according to one or more embodiments shown and described herein.

In the embodiments described herein, the coefficient of friction of the glass containers (both coated and uncoated) is measured with a vial-on-vial testing jig. The testing jig 200 is schematically depicted in FIG. 3. The same apparatus may also be used to measure the frictive force between two glass containers positioned in the jig. The vial-on-vial testing jig 200 comprises a first clamp 212 and a second clamp 222 arranged in a cross configuration (i.e., perpendicular to one another). The first clamp 212 comprises a first securing arm 214 attached to a first base 216. The first securing arm 214 attaches to the first glass container 210 and holds the first glass container 210 stationary relative to the first clamp 212. Similarly, the second clamp 222 comprises a second securing arm 224 attached to a second base 226. The second securing arm 224 attaches to the second glass container 220 and holds it stationary relative to the second clamp 222. The first glass container 210 is positioned on the first clamp 212 and the second glass container 220 is positioned of the second clamp 222 such that the long axis of the first glass container 210 and the long axis of the second glass container 220 are positioned at about a 90° angle relative to one another and on a horizontal plane defined by the x-y axis.

A first glass container 210 is positioned in contact with the second glass container 220 at a contact point 230. A normal force is applied in a direction orthogonal to the horizontal plane defined by the x-y axis. The normal force may be applied by a static weight or other force applied to the second clamp 222 upon a stationary first clamp 212. For example, a weight may be positioned on the second base 226 and the first base 216 may be placed on a stable surface, thus inducing a measurable force between the first glass container 210 and the second glass container 220 at the contact point 230. Alternatively, the force may be applied with a mechanical apparatus, such as a UMT (universal mechanical tester) machine.

The first clamp 212 or second clamp 222 may be moved relative to the other in a direction which is at a 45° angle with the long axis of the first glass container 210 and the second glass container 220. For example, the first clamp 212 may be held stationary and the second clamp 222 may be moved such that the second glass container 220 moves across the first glass container 210 in the direction of the x-axis. A similar setup is described by R. L. De Rosa et al., in "Scratch Resistant Polyimide Coatings for Alumino Silicate Glass surfaces" in The Journal of Adhesion, 78:113-127, 2002. To measure the coefficient of friction, the force required to move the second clamp 222 and the normal force applied to first and second glass containers 210, 220 are measured with load cells and the coefficient of friction is calculated as the quotient of the frictive force and the normal force. The jig is operated in an environment of 25° C. and 50% relative humidity.

In the embodiments described herein, the portion of the coated glass container with the coating has a coefficient of friction of less than or equal to about 0.7 relative to a like-coated glass container, as determined with the vial-on-vial jig described above. In other embodiments, the coefficient of friction may be less than or equal to about 0.6, or even less than or equal to about 0.5. In some embodiments, the portion of the coated glass container with the coating has a coefficient of friction of less than or equal to about 0.4 or even less than or equal to about 0.3. Coated glass containers with coefficients of friction less than or equal to about 0.7 generally exhibit improved resistance to frictive damage and, as a result, have improved mechanical properties. For example, conventional glass containers (without a coating) may have a coefficient of friction of greater than 0.7.

In some embodiments described herein, the coefficient of friction of the portion of the coated glass container with the coating is at least 20% less than a coefficient of friction of a surface of an uncoated glass container formed from a same glass composition. For example, the coefficient of friction of the portion of the coated glass container with the coating may be at least 20% less, at least 25% less, at least 30% less, at least 40% less, or even at least 50% less than a coefficient of friction of a surface of an uncoated glass container formed from a same glass composition.

In some embodiments, the portion of the coated glass container with the coating may have a coefficient of friction of less than or equal to about 0.7 after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the coating may not increase by more than about 30% after exposure to a temperature of about 250° C. (or about 260° C.) for 30 minutes. In other embodiments, coefficient of friction of the portion of the coated glass container with the coating may not increase by more than about 30% (i.e., about 25%, about 20%, about 15%, or even about 10%) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, coefficient of friction of the portion of the coated glass container with the coating may not increase by more than about 0.5 (i.e., about 0.45, about 0.4, about 0.35, about 0.3, about 0.25, about 0.2, about 0.15, about 0.1, or even about 0.05) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the coating may not increase at all after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes.

In some embodiments, the portion of the coated glass container with the coating may have a coefficient of friction of less than or equal to about 0.7 after being submerged in a water bath at a temperature of about 70° C. for 10 minutes. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the coating may not increase by more than about 30% after being submerged in a water bath at a temperature of about 70° C. for 10 minutes. In other embodiments, coefficient of friction of the portion of the coated glass container with the coating may not increase by more than about 30% (i.e., about 25%, about 20%, about 15%, or event about 10%) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the coating may not increase at all after being submerged in a water bath at a temperature of about 70° C. for 5 minutes, 10 minutes, 20 minutes, 30 minutes, 40 minutes, 50 minutes, or even 1 hour.

In some embodiments, the portion of the coated glass container with the coating may have a coefficient of friction of less than or equal to about 0.7 after exposure to lyophilization conditions. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after exposure to lyophilization conditions. In some embodiments, the coefficient of friction of the portion of the coated glass container with the coating may not increase by more than about 30% after exposure to lyophilization conditions. In other embodiments, coefficient of friction of the portion of the coated glass container with the coating may not increase by more than about 30% (i.e., about 25%, about 20%, about 15%, or event about 10%) after exposure to lyophilization conditions. In some embodiments, the coefficient of friction of the portion of the coated glass container with the coating may not increase at all after exposure to lyophilization conditions.

In some embodiments, the portion of the coated glass container with the coating may have a coefficient of friction of less than or equal to about 0.7 after exposure to autoclave conditions. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after exposure to autoclave conditions. In some embodiments, the coefficient of friction of the portion of the coated glass container with the coating may not increase by more than about 30% after exposure to autoclave conditions. In other embodiments, coefficient of friction of the portion of the coated glass container with the coating may not increase by more than about 30% (i.e., about 25%, about 20%, about 15%, or event about 10%) after exposure to autoclave conditions. In some embodiments, the coefficient of friction of the portion of the coated glass container with the coating may not increase at all after exposure to autoclave conditions.

The coated glass containers described herein have a horizontal compression strength. The horizontal compression strength, as described herein, is measured by positioning the coated glass container 100 horizontally between two parallel platens which are oriented in parallel to the long axis of the glass container. A mechanical load is then applied to the coated glass container 100 with the platens in the direction perpendicular to the long axis of the glass container. Prior to being placed in the platens, the glass containers are wrapped in 2 inch tape, and the overhang is cut off or folded around the bottom of the container. The container is then positioned within an index card that is stapled around the specimen. The load rate for vial compression is 0.5 in/min, meaning that the platens move towards each other at a rate of 0.5 in/min. The horizontal compression strength is measured at 25° C.±2° C. and 50%±5% relative humidity. It is desirable, in some embodiments, to perform the horizontal compression test within 1 hour (and not more than 24 hours) following depyrogenation to simulate pharmaceutical filling line conditions. The horizontal compression strength is a measurement of load at failure, and measurement of the horizontal compression strength can be given as a failure probability at a selected normal compression load. As used herein, failure occurs when the glass container ruptures under a horizontal compression in least 50% of samples. Thus, the horizontal compression is provided for a group of samples. In some embodiments, a coated glass container may have a horizontal compression strength at least 10%, 20%, or 30% greater than an uncoated vial.

Referring now to FIGS. 1 and 3, the horizontal compression strength measurement may also be performed on an abraded glass container. Specifically, operation of the testing jig 200 may create damage on the coated glass container outer surface 122, such as a surface scratch or abrasion that weakens the strength of the coated glass container 100. The glass container is then subjected to the horizontal compression procedure described above, wherein the container is placed between two platens with the scratch pointing outward parallel to the platens. The scratch can be characterized by the selected normal pressure applied by a vial-on-vial jig and the scratch length. Unless identified otherwise, scratches for abraded glass containers for the horizontal compression procedure are characterized by a scratch length of 20 mm created by a normal load of 30 N. It may be desired to have the scratch at a 90° angle relative to the platens, ±5°.

The coated glass containers can be evaluated for horizontal compression strength following a heat treatment. The heat treatment may be exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the horizontal compression strength of the coated glass container is not reduced by more than about 20%, 30%, or even 40% after being exposed to a heat treatment, such as those described above, and then being abraded, as described above. In one embodiment, the horizontal compression strength of the coated glass container is not reduced by more than about 20% after being exposed to a heat treatment of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, and then being abraded.

The coated glass articles described herein may be thermally stable after heating to a temperature of at least 250° C. (or 260° C., or 280° C., or 300° C.) for a time period of 30 minutes. The phrase "thermally stable," as used herein, means that the coating applied to the glass article remains substantially intact on the surface of the glass article after exposure to the elevated temperatures such that, after exposure, the mechanical properties of the coated glass article, specifically the coefficient of friction and the horizontal compression strength, are only minimally affected, if at all. This indicates that the coating remains adhered to the surface of the glass following elevated temperature exposure and continues to protect the glass article from mechanical insults such as abrasions, impacts and the like.

In the embodiments described herein, a coated glass article is considered to be thermally stable if the coated glass article meets both a coefficient of friction standard and a horizontal compression strength standard after heating to the specified temperature and remaining at that temperature for the specified time. To determine if the coefficient of friction standard is met, the coefficient of friction of a first coated glass article is determined in as-received condition (i.e., prior to any thermal exposure) using the testing jig depicted in FIG. 3 and a 30 N applied load. A second coated glass article (i.e., a glass article having the same glass composition and the same coating composition as the first coated glass article) is thermally exposed under the prescribed conditions and cooled to room temperature. Thereafter, the coefficient of friction of the second glass article is determined using the testing jig depicted in FIG. 3 to abrade the coated glass article with a 30 N applied load resulting in an abrasion (i.e., a "scratch") having a length of approximately 20 mm. If the coefficient of friction of the second coated glass article is less than 0.7 and the surface of the glass of the second glass article in the abraded area does not have any observable damage, then the coefficient of friction standard is met for purposes of determining the thermal stability of the coating. The term "observable damage," as used herein means that the surface of the glass in the abraded area of the glass article contains less than six glass checks per 0.5 cm of length of the abraded area when observed with a Nomarski or differential interference contrast (DIC) spectroscopy microscope at a magnification of 100X with LED or halogen light sources. A standard definition of a glass check or glass checking is described in G. D. Quinn, "NIST Recommended Practice Guide: Fractography of Ceramics and Glasses," NIST special publication 960-17 (2006).

To determine if the horizontal compression strength standard is met, a first coated glass article is abraded in the testing jig depicted in FIG. 3 under a 30 N load to form a 20 mm scratch. The first coated glass article is then subjected to a horizontal compression test, as described herein, and the retained strength of the first coated glass article is determined. A second coated glass article (i.e., a glass article having the same glass composition and the same coating composition as the first coated glass article) is thermally exposed under the prescribed conditions and cooled to room temperature. Thereafter, the second coated glass article is abraded in the testing jig depicted in FIG. 3 under a 30 N load. The second coated glass article is then subjected to a horizontal compression test, as described herein, and the retained strength of the second coated glass article is determined. If the retained strength of the second coated glass article does not decrease by more than about 20% relative to the first coated glass article (i.e., the load to failure does not decrease by more than 20%) then the horizontal compression strength standard is met for purposes of determining the thermal stability of the coating.

The coated glass containers are considered to be thermally stable if the coefficient of friction standard and the horizontal compression strength standard are met after exposing the coated glass containers to a temperature of at least about 250° C. (or 260° C. or 280° C.) for a time period of at least about 30 minutes (i.e., the coated glass containers are thermally stable at a temperature of at least about 250° C. (or 260° C. or 280° C.) for a time period of about 30 minutes). The thermal stability may also be assessed at temperatures from about 250° C. (or 260° C. or 280° C.) up to about 400° C. For example, in some embodiments, the coated glass containers will be considered to be thermally stable if the standards are met at a temperature of at least about 270° C. or even about 280° C. for a time period of about 30 minutes. In still other embodiments, the coated glass containers will be considered to be thermally stable if the standards are met at a temperature of at least about 290° C. or even about 300° C. for a time period of about 30 minutes. In further embodiments, the coated glass containers will be considered to be thermally stable if the standards are met at a temperature of at least about 310° C. or even about 320° C. for a time period of about 30 minutes. In still other embodiments, the coated glass containers will be considered to be thermally stable if the standards are met at a temperature of at least about 330° C. or even about 340° C. for a time period of about 30 minutes. In yet other embodiments, the coated glass containers will be considered to be thermally stable if the standards are met at a temperature of at least about 350° C. or even about 360° C. for a time period of about 30 minutes. In some other embodiments, the coated glass containers will be considered to be thermally stable if the standards are met at a temperature of at least about 370° C. or even about 380° C. for a time period of about 30 minutes. In still other embodiments, the coated glass containers will be considered to be thermally stable if the standards are met at a temperature of at least about 390° C. or even about 400° C. for a time period of about 30 minutes.

The coated glass containers disclosed herein may also be thermally stable over a range of temperatures, meaning that the coated glass containers are thermally stable by meeting the coefficient of friction standard and horizontal compression strength standard at each temperature in the range. For example, in the embodiments described herein, the coated glass containers may be thermally stable from at least about 250° C. (or 260° C. or 280° C.) to a temperature of less than or equal to about 400° C. In some embodiments, the coated glass containers may be thermally stable in a range from at least about 250° C. (or 260° C. or 280° C.) to about 350° C. In some other embodiments, the coated glass containers may be thermally stable from at least about 280° C. to a temperature of less than or equal to about 350° C. In still other embodiments, the coated glass containers may be thermally stable from at least about 290° C. to about 340° C. In another embodiment, the coated glass container may be thermally stable at a range of temperatures of about 300° C. to about 380° C. In another embodiment, the coated glass container may be thermally stable at a range of temperatures from about 320° C. to about 360° C.

The coated glass containers described herein have a four point bend strength. To measure the four point bend strength of a glass container, a glass tube that is the precursor to the coated glass container 100 is utilized for the measurement. The glass tube has a diameter that is the same as the glass container but does not include a glass container base or a glass container mouth (i.e., prior to forming the tube into a glass container). The glass tube is then subjected to a four point bend stress test to induce mechanical failure. The test is performed at 50% relative humidity with outer contact members spaced apart by 9" and inner contact members spaced apart by 3" at a loading rate of 10 mm/min.

The four point bend stress measurement may also be performed on a coated and abraded tube. Operation of the testing jig 200 may create an abrasion on the tube surface such as a surface scratch that weakens the strength of the tube, as described in the measurement of the horizontal compression strength of an abraded vial. The glass tube is then subjected to a four point bend stress test to induce mechanical failure. The test is performed at 25° C. and at 50% relative humidity using outer probes spaced apart by 9" and inner contact members spaced apart by 3" at a loading rate of 10 mm/min, while the tube is positioned such that the scratch is put under tension during the test.

In some embodiments, the four point bend strength of a glass tube with a coating after abrasion shows on average at least 10%, 20%, or even 50% higher mechanical strength than that for an uncoated glass tube abraded under the same conditions.

In some embodiments, after the coated glass container 100 is abraded by an identical glass container with a 30 N normal force, the coefficient of friction of the abraded area of the coated glass container 100 does not increase by more than about 20% following another abrasion by an identical glass container with a 30 N normal force at the same spot, or does not increase at all. In other embodiments, after the coated glass container 100 is abraded by an identical glass container with a 30 N normal force, the coefficient of friction of the abraded area of the coated glass container 100 does not increase by more than about 15% or even 10% following another abrasion by an identical glass container with a 30 N normal force at the same spot, or does not increase at all. However, it is not necessary that all embodiments of the coated glass container 100 display such properties.

In some embodiments, the coated glass container 100 may have a coating 120 that is capable of receiving an adhesive label. That is, the coated glass container 100 may receive an adhesive label on the coated surface such that the adhesive label is securely attached. However, the ability of attachment of an adhesive label is not a requirement for all embodiments of the coated glass containers 100 described herein.

Several non-limiting aspects are disclosed herein. A first aspect includes a coated pharmaceutical package comprising a glass container comprising a first surface and a second surface opposite the first surface, wherein the first surface is an outer surface of the glass container, and wherein the glass container in an uncoated state has an average light transmittance in the UVB and UVC spectrum of at least 50% through a single wall of the coated package; and a coating positioned over at least a portion of the first surface of the glass container, wherein the coated pharmaceutical package has an average light transmittance in the UVC spectrum of less than 50% through a single wall of the coated package, and wherein the coated pharmaceutical package has a light transmittance of less than 20% at all wavelengths from 400 nm to 450 nm.

Another aspect includes any of the previous aspects, wherein the coated package meets that standard of USP <660> Spectral Transmission for Colored Glass Containers.

Another aspect includes any of the previous aspects, wherein the glass container in the uncoated state is visibly colorless.

Another aspect includes any of the previous aspects, wherein the coating comprises a polymer and one or more of copper, silver, or iron.

Another aspect includes any of the previous aspects, wherein the polymer is a polyimide.

Another aspect includes any of the previous aspects, where the coating further comprises a reducing agent.

Another aspect includes any of the previous aspects, wherein the reducing agent is a silane.

Another aspect includes any of the previous aspects, wherein the coating comprises a coupling agent layer comprising a silane and one or more of silver, copper, or iron, and further comprises a polymer layer comprising polyimide.

Another aspect includes any of the previous aspects, wherein the coating comprises a mixed layer comprising: a polyimde; one or more of titania, alumina, or zirconia; and one or more of silver, copper, or iron.

Another aspect includes a coated pharmaceutical package comprising: a glass container comprising a first surface and a second surface opposite the first surface, wherein the first surface is an outer surface of the glass container, and wherein the glass container in an uncoated state has an average light transmittance in the UVB and UVC spectrum of at least 50% through a single wall of the coated package; and a coating positioned over at least a portion of the first surface of the glass container, wherein the coated pharmaceutical package has an average light transmittance in the UVC spectrum of less than 50% through a single wall of the coated package, and wherein the coated pharmaceutical package is visibly colorless.

Another aspect includes any of the previous aspects, wherein the coating comprises a Bragg mirror comprising at least a high refractive index layer and a low refractive index layer, wherein the high refractive index layer has a refractive index of at least 0.5 greater than the refractive index of the low refractive index layer.

Another aspect includes any of the previous aspects, wherein the coating comprises a high pass filter comprising at least a high refractive index layer and a low refractive index layer, wherein the high refractive index layer has a refractive index of at least 0.5 greater than the refractive index of the low refractive index layer.

Another aspect includes any of the previous aspects, wherein the high pass band filter is a Fabry Perot cavity filter comprising at least a high refractive index layer and a low refractive index layer separated by an absorbing layer, wherein the high refractive index layer has a refractive index of at least 0.5 greater than the refractive index of the low refractive index layer.

Another aspect includes any of the previous aspects, wherein the coating comprises: a first layer in contact with the glass container and comprising polyimide and one or more of alumina, titania, or zirconia; and a second layer over the first layer and consisting of polyimide.

Another aspect includes any of the previous aspects, wherein the coating comprises cavities, wherein the refractive index of the coating is at least 0.5 greater than the refractive index of the cavity.

Another aspect includes any of the previous aspects, wherein the cavities are formed by the decomposition or volatilization of a sacrificial material during a thermal treatment.

Another aspect includes any of the previous aspects, wherein the coating comprises one or more compounds, wherein the one or more compounds absorb ultraviolet light and dissipates at least 50% of the absorbed energy as heat.

Another aspect includes any of the previous aspects, wherein the one or more compounds comprises one or more of benzophenones, benzotriazoles, triazines, and oxalanilides.

Another aspect includes any of the previous aspects, wherein the coating comprises one or more photochromic compounds, wherein: the one or more photochromic compounds exhibit a first absorption spectrum and a second absorption spectrum; the photochromic compounds exhibit the second absorption spectrum when exposed to ultraviolet light of a sufficient intensity for a sufficient length of time; and the second absorption spectrum absorbs at least 5% more ultraviolet light than the first absorption spectrum.

Another aspect includes any of the previous aspects, wherein the one or more photochromic compounds may comprise one or more of hexaarylbiimidazoles, diarylethenes, photochromic quinones, or zinc compounds.

EXAMPLES

The various embodiments of glass containers with coatings will be further clarified by the following examples. The examples are illustrative in nature, and should not be understood to limit the subject matter of the present disclosure. It should be understood that, in all examples, uncoated vials were colorless to the naked eye unless specified otherwise. Also, all light transmission is reported as passing through a single wall of the glass vial, which can be measured by cutting the vial in half or by calculating the light transmission measure through two walls of a vial.

Example 1-Polyimide Single Layer

Figure 7:
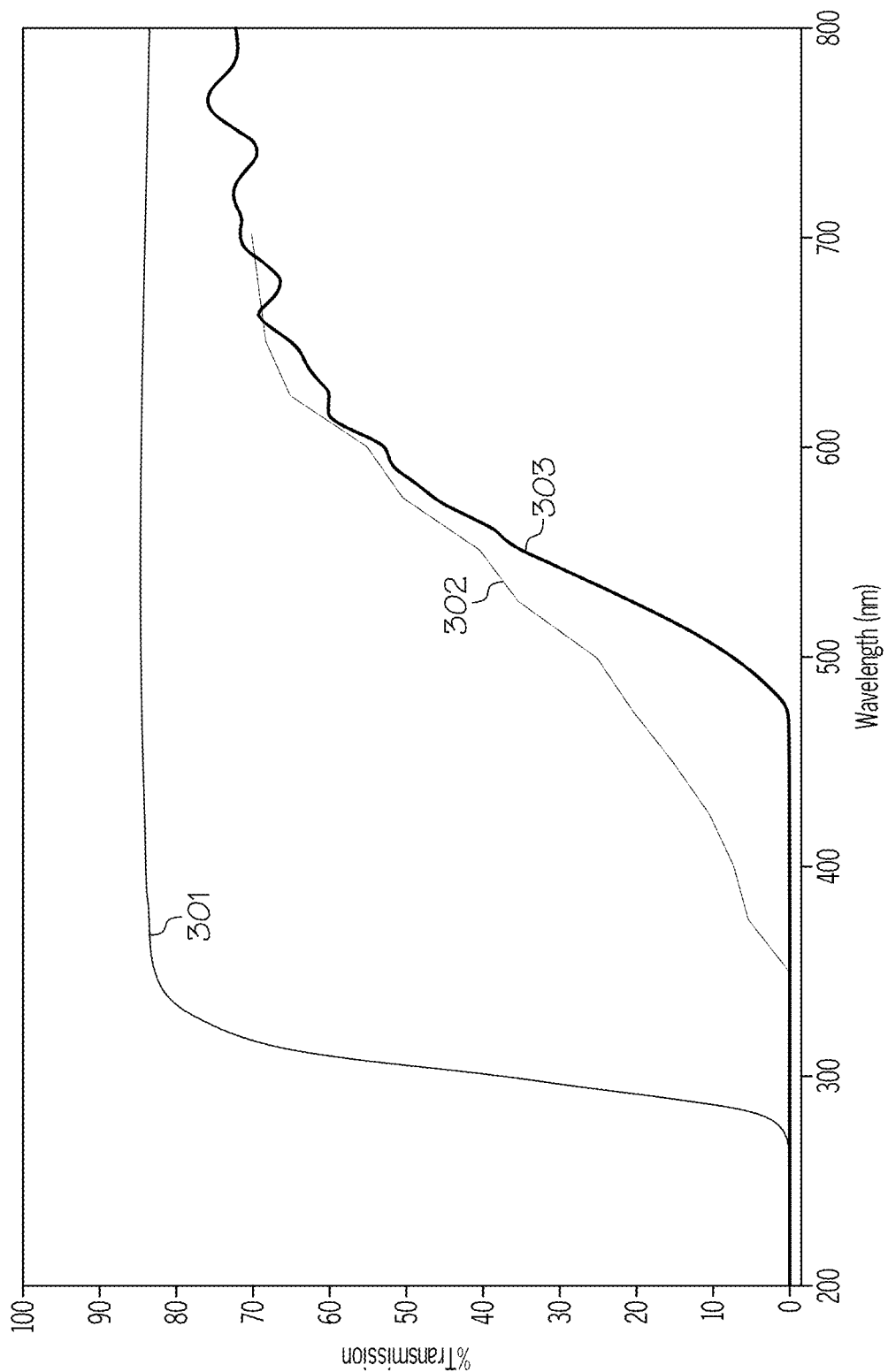
FIG. 7 depicts a light transmission spectrum of an example embodiment, according to one or more embodiments shown and described herein.

An ion exchanged alkali aluminosilicate glass vial (16.75 mm outer diameter) was coated with PMDA-ODA Kapton polyimide coating. The vial was colorless to the eye prior to coating. Spectral transmission data is provided in FIG. 7 for the uncoated vial (301), the coated vial (302), and a comparative amber vial common in the marketplace (303). Spectral data was gathered for light passing through two wall of the vial. As is shown in FIG. 7, the coated vial provided adequate UV protection, equivalent to that of an amber vial in many UV wavelengths. Less than 10% transmittance was observed across the entire UV spectrum.

Example 2-Mixed Metal Oxide/Polyimide Layer

A coating was applied to an aluminosilicate glass. The coating was prepared by mixing Tyzor BTP (a commercially available n-butyl polytitanate) with Nexolve CP1 (a commercially available polyimide) in a weight ratio of 95/5 Tyzor BTP/CP1. The coating mixture contained 3.35 wt. % solids (i.e., the Tyzor BTP and CP1) with the remainder solvent. Additional solids ratios of 7/93 and 10/90 were also tested. The solvent consisted of n-propylacetate and Dowanol PMA in a 89/7 ratio by weight. The coating was sprayed onto numerous vials in an airless spray. The coating was then cured at 350° C. in a convection oven.

The coating thickness was varied by controlling the spray time and percent solids utilized. Table 1 shows coating spraying time and the resulting average thickness, as well as number of samples tested. All samples had a coefficient of friction of less than 0.5.

Figure 13:
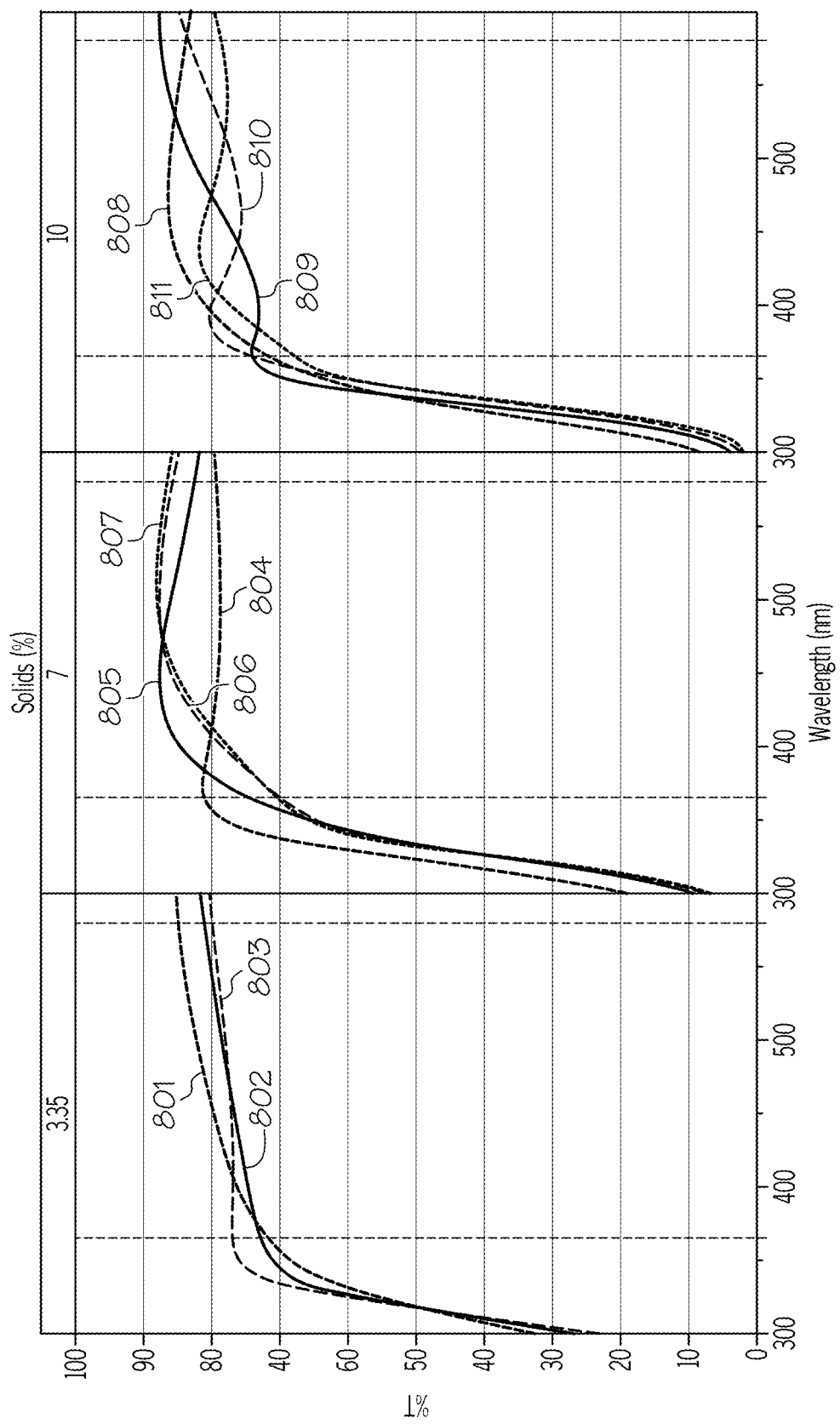
FIG. 13 depicts light transmission spectra of example embodiments, according to one or more embodiments shown and described herein.

The light transmission was tested for each of Samples A-K of Table 1. The light transmission is depicted in FIG. 13, and Table 1 provides the figure numbers corresponding to each sample. Light transmission was determined from a single vial measured at three locations and averaged.

TABLE 1

| Sample | Average Coating Thickness (nm) | Spraying Time (ms) | Solids wt. % | Number of Samples | Corresponding line of FIG. 13 |
|---|---|---|---|---|---|
| A | 35.9 | 43 | 3.35 | 75 | 801 |
| B | 46.0 | 64 | 3.35 | 75 | 802 |
| C | 52.8 | 85 | 3.35 | 69 | 803 |
| D | 72.8 | 43 | 7 | 68 | 804 |
| E | 95.7 | 64 | 7 | 55 | 805 |
| F | 105.4 | 85 | 7 | 29 | 806 |
| G | 105.7 | 100 | 7 | 19 | 807 |
| H | 99.6 | 43 | 10 | 45 | 808 |
| I | 133.3 | 64 | 10 | 16 | 809 |
| J | 152.3 | 85 | 10 | 12 | 810 |
| K | 168.6 | 100 | 10 | 11 | 811 |

As can be seen from the data of Table 1 and FIG. 13, the UV protection was relatively good regardless of coating thickness. Applying additional coating did not provide substantially more UV protection. It is believed that increasing the thickness does not make a linearly increasing attenuation because of thin film light interference effects due to film thickness and high reflectivity.

Example 3-Mixed Polyimide/Metal Oxide Underlayer and Polyimide Overlayer

A coating that contained Tyzor BTP (a commercially available n-butyl polytitanate) with Nexolve CP1 (a commercially available polyimide) in a weight ratio of 95/5 Tyzor BTP/CP1 was applied at a solids wt. % of 3.35, similar to that of Example 2. The coating was applied and cured as disclosed in Example 2. Then, over the initial layer, of layer of only CP1 was applied, where the solids wt. % of CP1 in solvent was varied, and spray time and/or dipping was controlled to attain desired thickness of the outer coating layer. The outer coating layer of CP1 was cured as well at 350° C.

Figure 14:
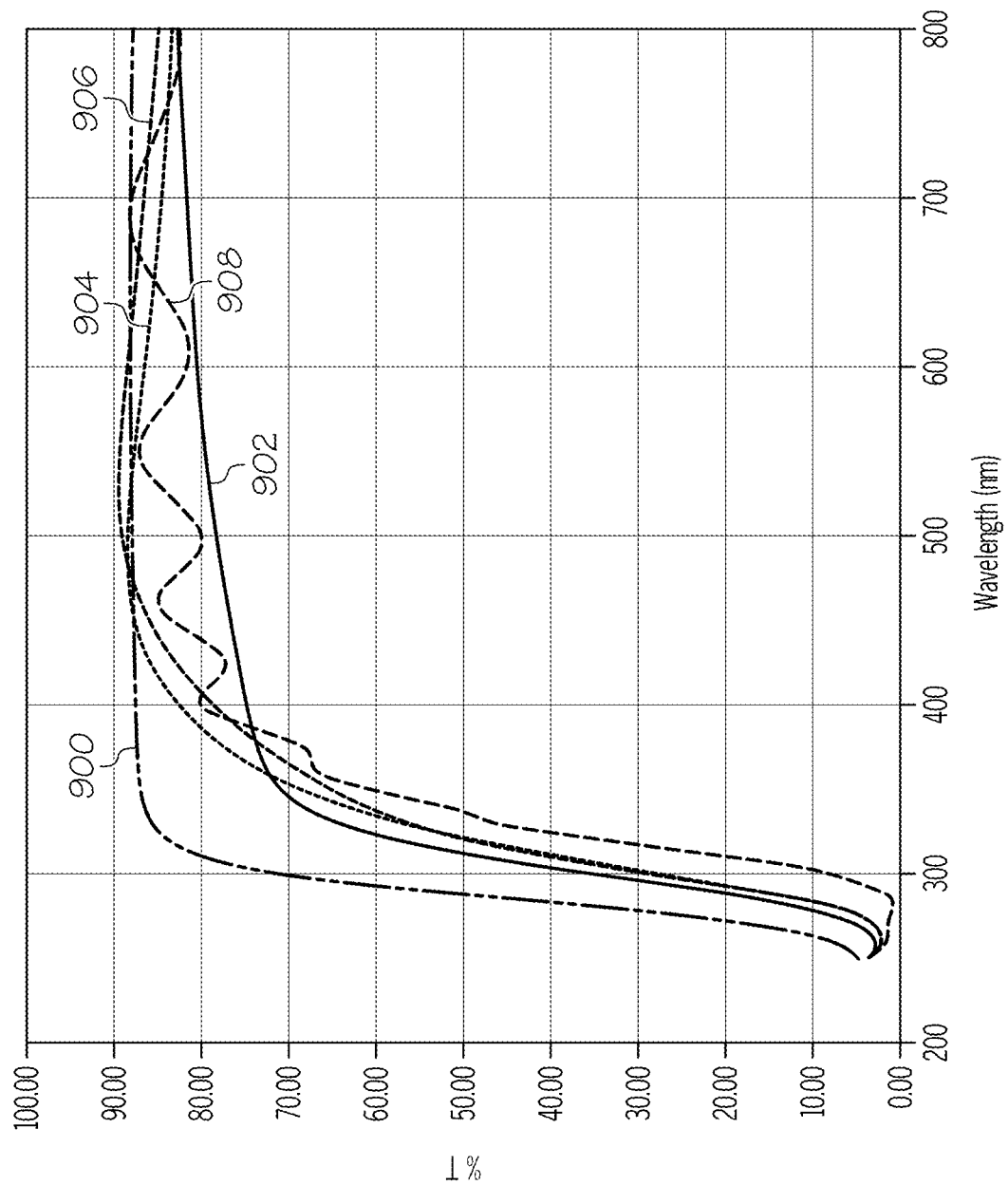
FIG. 14 depicts light transmission spectra of example embodiments, according to one or more embodiments shown and described herein.

The light transmission was tested for each of Samples L-O of Table 2. Sample P is indicative of bare glass (uncoated). The light transmission is depicted in FIG. 14, and Table 2 provides the figure numbers corresponding to each sample. Light transmission was determined from a single vial measured at three locations and averaged. All samples had a coefficient of friction of less than 0.5 and were colorless to the naked eye.

TABLE 2

| Sample | Average Coating Thickness of Tyzor/CP1 underlayer (nm) | Average Coating Thickness of CP1 overlayer (nm) | Solids wt. % of CP1 overlayer | Number of Samples | Corresponding line of FIG. 14 |
| --- | --- | --- | --- | --- | --- |
| L | 28.7 | 25.6 | 0.5 | 81 | 902 |
| M | 32.0 | 72.6 | 1.5 | 75 | 904 |
| N | 31.1 | 88.5 | 3 | 66 | 906 |
| O | 40.5 | 859.0 | 6 | 58 | 908 |
| P | 0 | 0 | N/A | N/A | 900 |

As is seen through the changes in thicknesses of the polyimide overlayer, increasing the thickness does not make a linearly increasing attenuation because of thin film light interference effects due to film thickness and high reflectivity.

Example 4-Aminopropyl Silsesquioxane Underlayer and Polyimide Overlayer

A coated pharmaceutical package was prepared as follow. The vials to be coated were washed with de-ionized water, blown dry with nitrogen, and finally cleaned by exposure to oxygen plasma for 15 seconds prior to coating. Then, the vials were dip-coated as follow. First, a tie layer of aminopropyl silsequioxane (SSQ) was applied on the glass surface by dip coating using a 4 wt. % SSQ. The 4 wt. % SSQ solution was prepared from a 22-25% stock SSQ solution, available from ABCR under the reference AB127715, CAS No: 29159-37-3, and diluted with a mix of methanol and water.

The SSQ tie layer was deposited by dip coating at a 200 mm/min withdrawing speed and was cured at 150° C. for 8 min. The 150 nm thick SSQ tie layer obtained was overcoated with a PMDA-ODA polyimide layer. The polyimide layer was prepared from PMDA-ODA polyamic acid in NMP/Xylene, CAS 25038-81-7, available from Sigma Aldrich under the reference 575771, was convert into its triethylamine (TEA) salt form and dissolved in a methanol. The PMDA-ODA-TEA solution concentration was 3.6% by weight. Coatings exhibiting different thicknesses were prepared by dip coating at a withdrawing speed ranging from 50, 200, 400, 700, 1000 mm/min. The PMDA-ODA coating was cured at 360° C. for 15 min to allow the imidization reaction to occur. The coated vials were visibly yellow in color, and increased in yellow intensity with thickness.

Figure 8:
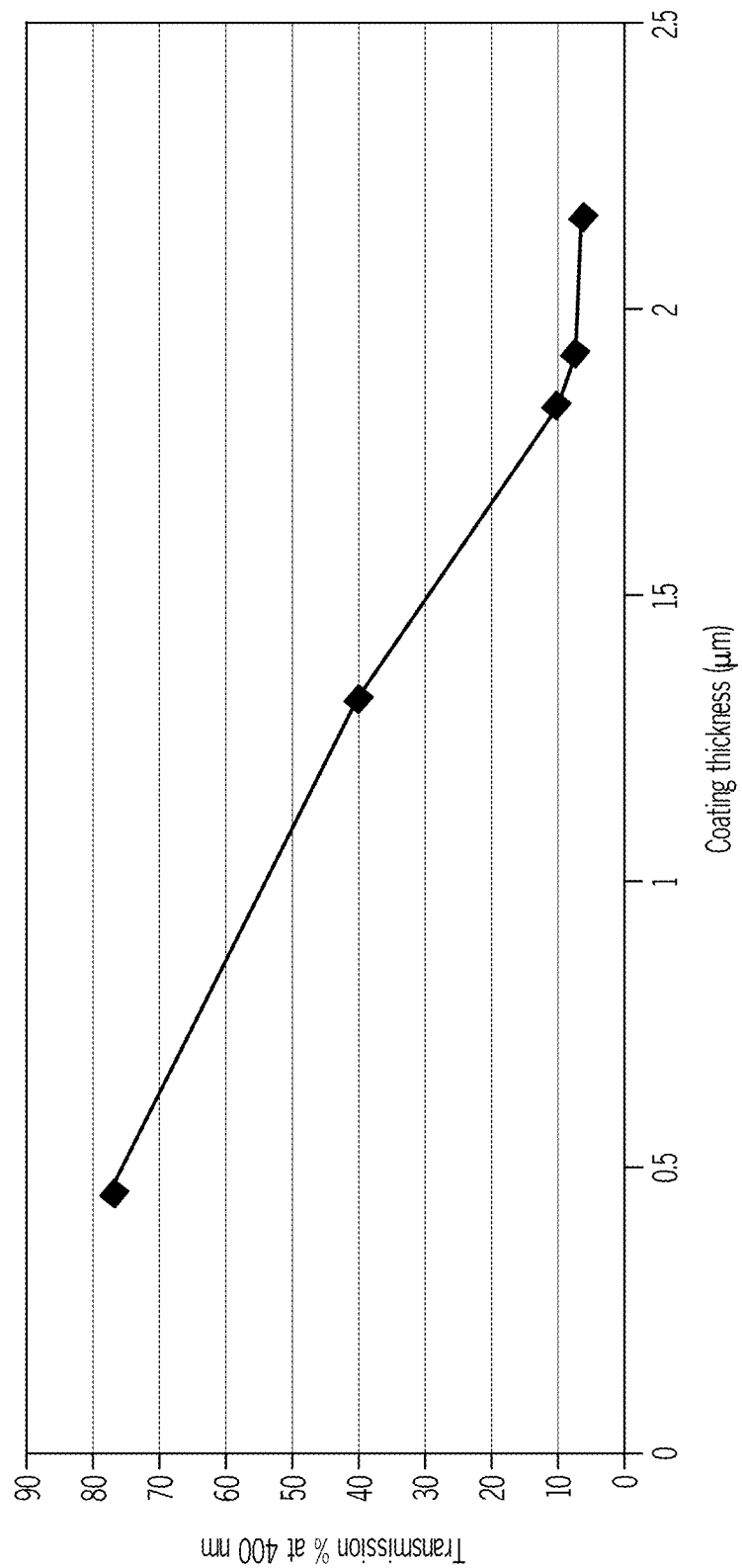
FIG. 8 depicts light transmission data of example embodiments, according to one or more embodiments shown and described herein.
Figure 10:
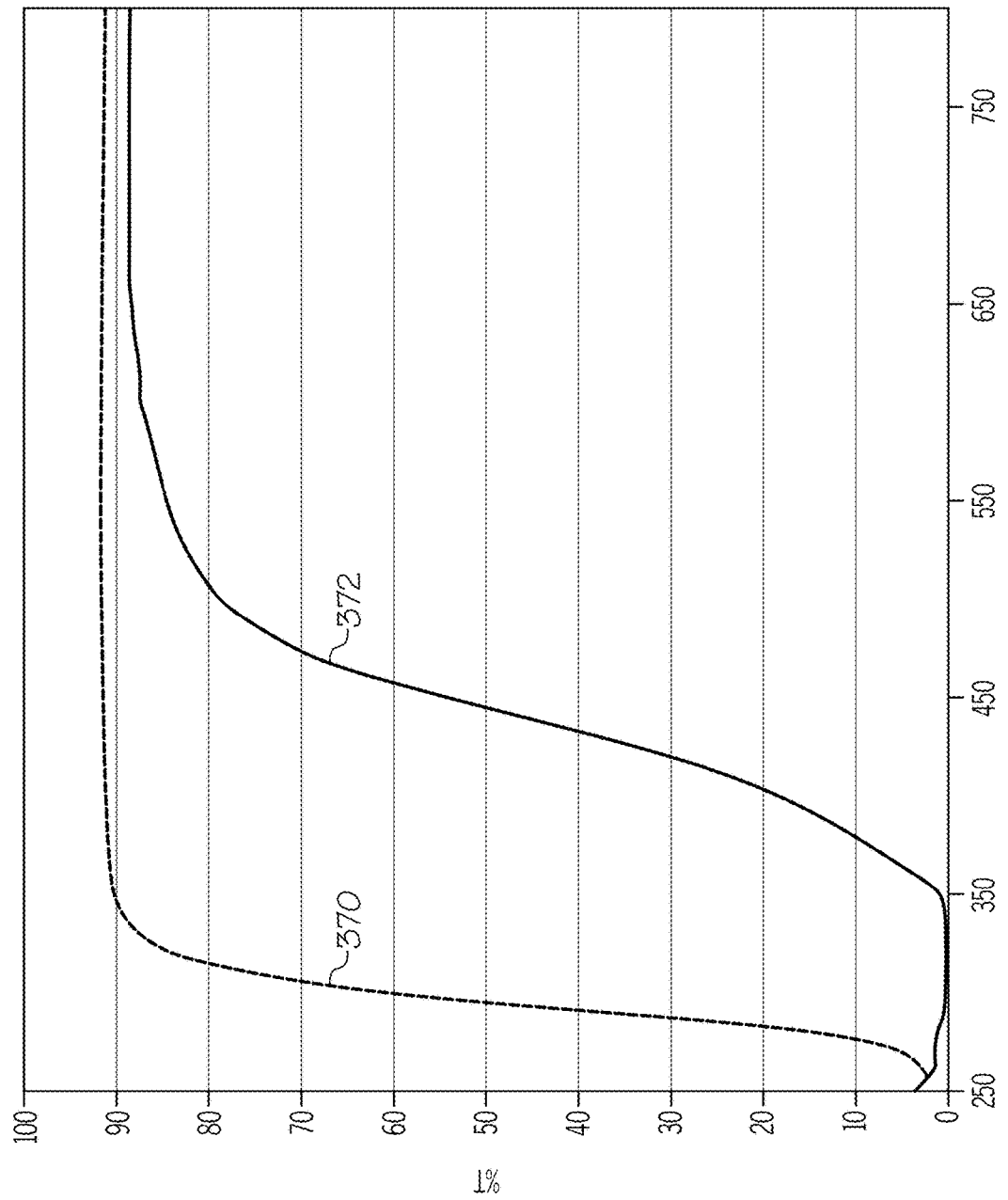
FIG. 10 depicts light transmission spectra of example embodiments, according to one or more embodiments shown and described herein.

The thickness of the coating was determined using a ZYGO interferometers to precisely measure the total coating thickness. Thicknesses ranging from 0.5 to about 2.2 µm was achieved. The measured thicknesses are given in FIG. 8, which also depicts light transmission for each sample at 400 nm. The light transmission was determined using a spectrophotometer, Agilent, Cary 5000 equipped with an integrating sphere, DRA2500, passing through two walls of the vial. FIG. 10 shows transmission spectra for the sample dipped at 400 mm/min (372) versus an uncoated vial (370).

Figure 9:
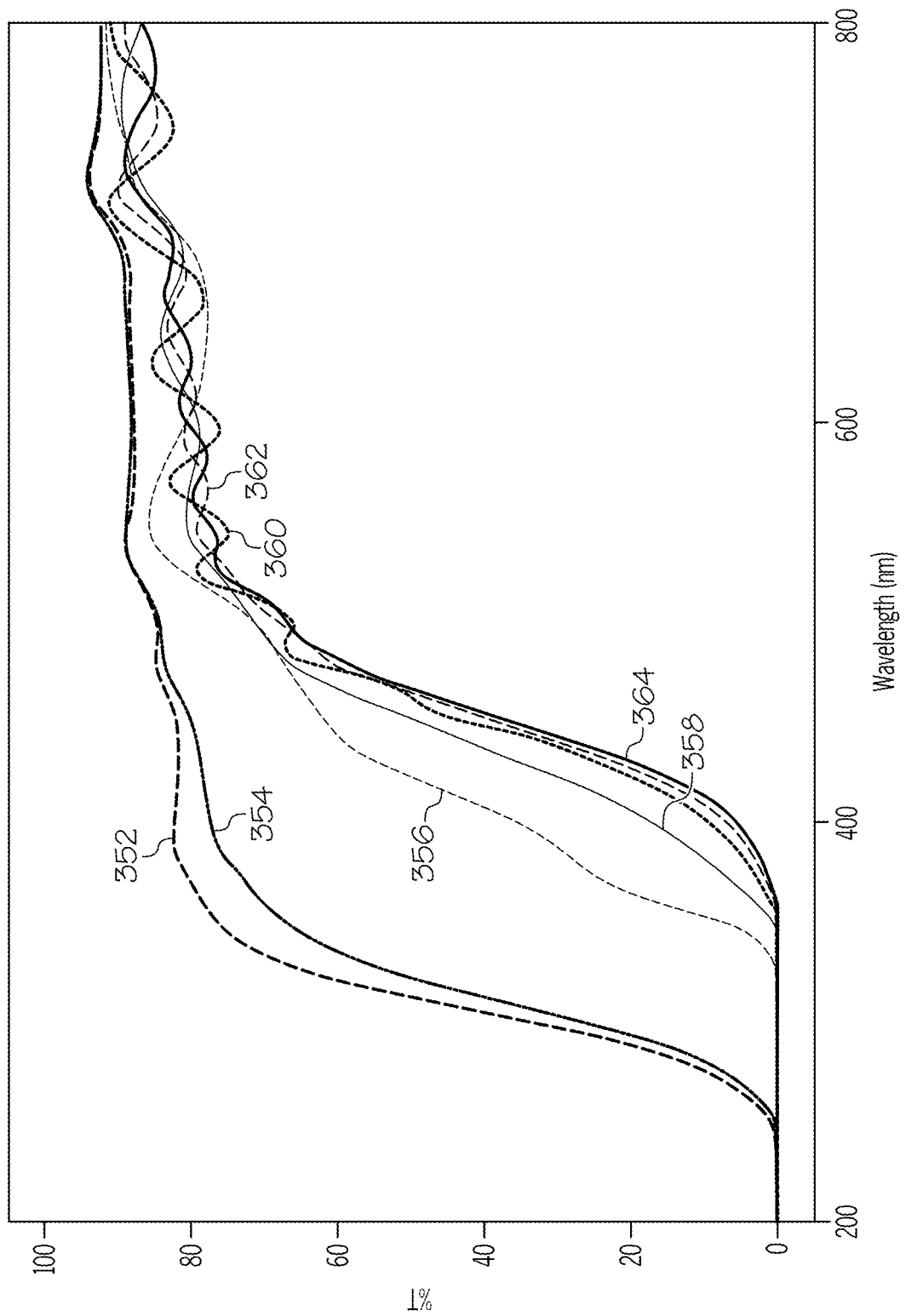
FIG. 9 depicts light transmission spectra of example embodiments, according to one or more embodiments shown and described herein.

The vials were then longitudinally cut in two halves using a diamond and the transmission was measured through a single wall for the SSQ/PMDA-ODA coating prepared at 400 mm/min dip coating speed. FIG. 9 depicts the transmissions curves obtained for the uncoated and coated vials. Below, Table 3 shows the dipping speeds utilized for polyimide layer deposition (i.e., the PMDA-ODA outer layer).

One sample was not coated as a reference, and another sample was coated with SSQ but not PMDA-ODA as another reference.

TABLE 3

| Dip Speed (mm/min) | Line Number in FIG. 9 |
| --- | --- |
| NA (completely uncoated vial) | 352 |
| N/A (only coated with SSQ) | 354 |
| 50 | 356 |
| 200 | 358 |
| 400 | 360 |
| 700 | 362 |
| 1,000 | 364 |

As is shown in FIG. 9, in several samples a great deal of or all of UVB and UVC radiation is blocked, whereas the transmittance in the visible range remains relatively good.

The coated pharmaceutical packages were depyrogenated at 260° C. for 30 min and subjected to the scratch test under 30N load using a vial-on-vial testing jig. The coefficient of friction refers here to the coefficient of friction measured with a normal load of 30 N measured on a vial-on-vial testing jig. COF testing was conducted on samples as cured, i.e, after 360° C. for 15 hours thermal treatment, and following a heat treatment of 260° C. for 0.25 hours. After being tested under 30 N load, the surface was free of scratches, and wear was not visible. The average coefficient of friction (COF) was measured as 0.22.

Example 5-Colloidal Silver Incorporated Into Polyimide Coating

This example illustrates the preparation of glass package having an UV-blocking polyimide film made by in-situ reduction of silver ions. A silver salt particle suspension was prepared by dissolving 0.9 g AgNO$_3$ in 11 mL ethanol followed by addition of 7.68 g of N-[3-(Trimethoxysilyl)propyl] ethylenediamine, CAS number 1760-24-3 available from Sigma Aldrich under the ref 104884. The suspension was aged at room temperature for 24 hours. Then a coating composition was made by adding 10 g of the supernatant of this silver particle suspension into 20 g of a polyamic acid solution consisting in 1.46 g of PMDA-ODA polyamic acid in its form of triethylamine salt, 13 g of methanol, 4.2 g of NMP and 1 g of Xylene. The solution was homogenized by manual mixing. Then clean glass vials were dip-coated using the solution of polyamic/silver mixture described above. Thereafter, the coated vials were dried using hot air supplied by an air gun set at about 500° C., followed by a heat treatment of 350° C. for 0.25 hours.

Figure 11:
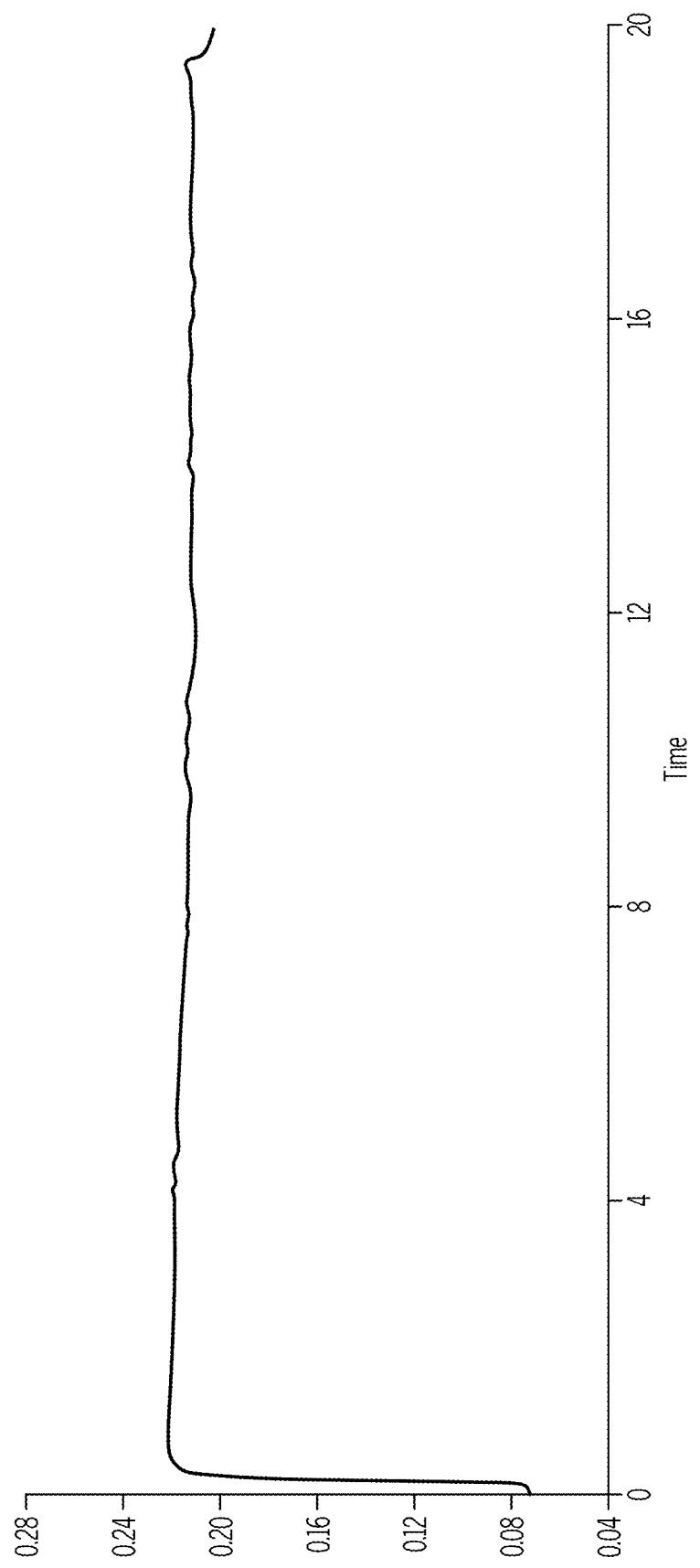
FIG. 11 depicts coefficient of friction data of example embodiments, according to one or more embodiments shown and described herein.

The coated vials exhibited a brown color which is darker than the PMDA-ODA coating free of silver. The vials were subjected to the scratch test under 30 N load using a vial-on-vial testing jig. A micrograph of the surface of the coating after being tested under 30 N load showed that the surface was free of scratches, wear was not visible, and the average coefficient of friction (COF) was 0.22, which is shown in FIG. 11 where the y-axis represents COF and the x-axis represents time or distance of scratch testing.

Example 6-Silver Incorporated Into Another Polyimide Coating

The protocol of example 5 was repeated except that the PMDA-ODA polyamic acid was replaced by the 6FDA-4-BDAF polyimide commercially available from NEXOLVE as LARC-CP1. The solution was prepared by adding 10 ml N-(2-Aminoethyl-3-aminopropyl) trimethoxysilane-$AgNO_3$-EtOH mixture, similar as prepared in Example 5 but using a different reducing agent, into 20 ml 3.5 wt. % LARC-CP1 polyimde dissolved in n-propyl acetate. After dip coating the wet layer was dried under a gentle hot air flow set at about 500° C. during for 2-3 minutes after which amber brown color appeared. The coating was then post-cured at 360° C. for 15 minutes. An amber vial was obtained.

Example 7-Copper and Iron Incorporated into Tie-Layer Undercoat

This example illustrates the preparation of a glass package having a UV-blocking tie layer made by in-situ reduction of iron and copper ions and having an overcoat made of clear LARC-CP1. polyimide coating (6FDA-4-BDAF polyimide commercially available from NEXOLVE as ref. LARC-CP1).

Figure 12:
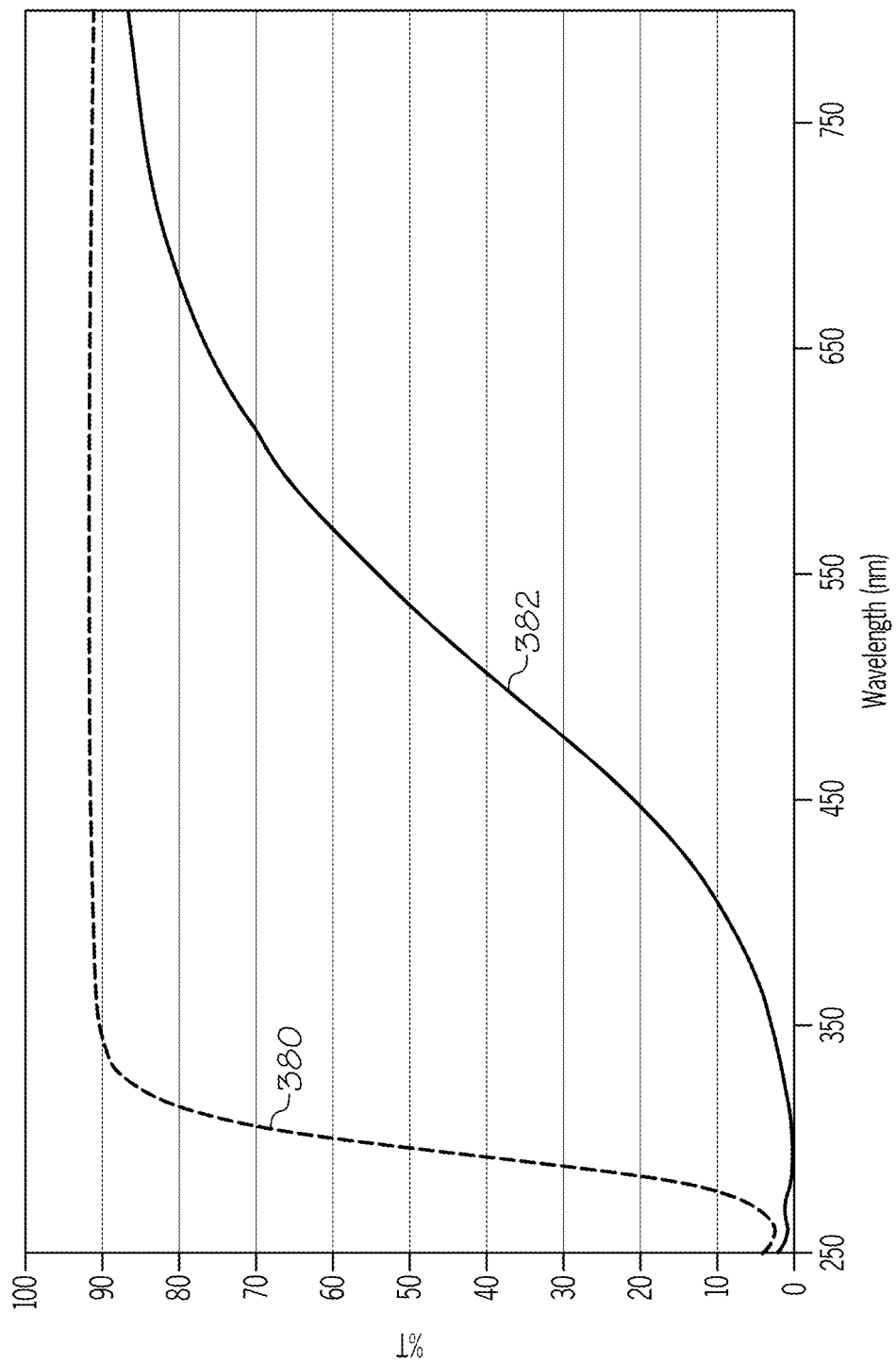
FIG. 12 depicts light transmission spectra of example embodiments, according to one or more embodiments shown and described herein

A suspension containing both copper and iron salt particles was prepared by dissolving 0.126 g copper nitrate and 0.91 iron nitrate in 13 g proof ethanol, followed by the addition of 8.75 g N-[3-(Trimethoxysilyl)propyl] ethylenediamine. The solution was aged for 24 hours. Then cleaned glass vials were dip-coated at a withdrawing speed of 300 mm/min to coat this solution onto the glass. Thereafter, the coated vials were dried using hot air supplied by an air gun set at about 600° C. for 3 minutes. The COF of the tie layer alone was found to be about 0.52 with a good glass protection against scratching. In order to reduce the COF even more the vials on which the UV-blocking tie layer was applied were subsequently dip-coated using a 3.5 wt. % clear polyimide solution prepared from LARC-CP1 dissolved in n-propyl acetate. The resulting coating was made of an amber tie layer with a polyimide overlayer and exhibited a COF of about 0.27. One vial was longitudinally cut in two halves using a diamond and the transmission was measured through a single wall. The transmission for the uncoated vials (380) and coated glass vials (382) are shown in FIG. 12, respectively.

Example 8-Iron Incorporated into Mixed Titanium/Polyimide Coating

A solution of 3 g of titanium butoxide (5593-70-4, Sigma Aldrich) and 2 g of Iron (III) methacrylate (CAS #94275-77-1, Gelest) in 95 g of n-propylacetate was prepared, which was stored at room temperature for 3 days. The solution formed a colored complex that had a very yellowish amber color. To the solution was added 0.25 g of Nexolve colorless polyimide CP1 and was mixed unti. dissolved (2 hours). A vial was dipped into the solution and removed at 240 mm/min. The vial was then blotted dry and place on mesh rack, following by curing at 350° C.

In some samples, an additional outer layer of CP1 polyimde was applied and cured over the first layer. The CP1 polyimide was applied in a 3 wt. % solids solution at a dip speed of 240 mm/min, and cured at 350° C.

Example 9

A coating was applied identical to that of Example 8, but instead of Iron (III) methacrylate, 1.8 g of Iron (III) 2,4 Pentanedionate (CAS #14024-18-1, Gelest) was added.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A coated pharmaceutical package comprising:
   a glass container comprising a first surface and a second surface opposite the first surface, wherein the first surface is an outer surface of the glass container, and wherein the glass container in an uncoated state has an average light transmittance in the UVB spectrum (from 290 to 320 nm) and in the UVC spectrum (from 200 to 290 nm) of at least 50% through a single wall of the glass container; and
   a coating positioned over at least a portion of the first surface of the glass container, wherein the coated pharmaceutical package has an average light transmittance in the UVC spectrum of less than 50% through a single wall of the coated package, and wherein the coated pharmaceutical package is visibly colorless,
   wherein the coating comprises cavities, wherein the refractive index of the coating is at least 0.5 greater than the refractive index of the cavities.

2. The coated pharmaceutical package of claim 1, wherein the coating comprises a Bragg mirror comprising at least a high refractive index layer and a low refractive index layer, wherein the high refractive index layer has a refractive index of at least 0.5 greater than the refractive index of the low refractive index layer.

3. The coated pharmaceutical package of claim 1, wherein the coating comprises a high pass filter comprising at least a high refractive index layer and a low refractive index layer, wherein the high refractive index layer has a refractive index of at least 0.5 greater than the refractive index of the low refractive index layer.

4. The coated pharmaceutical package of claim 3, wherein the high pass filter is a Fabry Perot cavity filter comprising at least a high refractive index layer and a low refractive index layer separated by an absorbing layer, wherein the high refractive index layer has a refractive index of at least 0.5 greater than the refractive index of the low refractive index layer.

5. The coated pharmaceutical package of claim 1, wherein the coating comprises:
   a first layer in contact with the glass container and comprising polyimide and one or more of alumina, titania, or zirconia; and
   a second layer over the first layer and consisting of polyimide.

6. The coated pharmaceutical package of claim 1, wherein the cavities are formed by the decomposition or volatilization of a sacrificial material during a thermal treatment.

7. The coated pharmaceutical package of claim 1, wherein the coating comprises one or more compounds, wherein the one or more compounds absorb ultraviolet light and dissipates at least 50% of the absorbed energy as heat.

8. The coated pharmaceutical package of claim 7, wherein the one or more compounds comprises one or more of benzophenones, benzotriazoles, triazines, and oxalanilides.

9. The coated pharmaceutical package of claim 1, wherein the coating comprises one or more photochromic compounds, wherein:
   the one or more photochromic compounds exhibit a first absorption spectrum and a second absorption spectrum;

the photochromic compounds exhibit the second absorption spectrum when exposed to ultraviolet light of a UV sunlight intensity for a length of time of 0.5 seconds to 20 minutes; and the second absorption spectrum absorbs at least 5% more ultraviolet light than the first absorption spectrum.

10. The coated pharmaceutical package of claim 9, wherein the one or more photochromic compounds may comprise one or more of hexaarylbiimidaxoles, diarylethenes, photochromic quinones, or zinc compounds.

* * * * *